(12) United States Patent
Utsugi

(10) Patent No.: US 8,817,137 B2
(45) Date of Patent: Aug. 26, 2014

(54) IMAGE PROCESSING DEVICE, STORAGE MEDIUM STORING IMAGE PROCESSING PROGRAM, AND ELECTRONIC CAMERA

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 106 days.

(21) Appl. No.: 13/463,361

(22) Filed: May 3, 2012

(65) Prior Publication Data

US 2012/0287299 A1   Nov. 15, 2012

(30) Foreign Application Priority Data

May 13, 2011   (JP) ................................. 2011-108385

(51) Int. Cl.
*H04N 9/64* (2006.01)
*H04N 5/235* (2006.01)
*G06K 9/00* (2006.01)

(52) U.S. Cl.
USPC ......................... 348/246; 348/222.1; 382/167

(58) Field of Classification Search
USPC ....................................................... 348/222.1
See application file for complete search history.

(56) References Cited

U.S. PATENT DOCUMENTS

| 7,016,549 | B1  |   | 3/2006 | Utagawa |         |
|-----------|-----|---|--------|---------|---------|
| 7,236,628 | B2  | * | 6/2007 | Chen et al. | 382/167 |
| 7,362,897 | B2  | * | 4/2008 | Ishiga  | 382/167 |

FOREIGN PATENT DOCUMENTS

| JP | A-2000-244934 | 9/2000 |
| JP | A-2001-061157 | 3/2001 |

OTHER PUBLICATIONS

Japanese Office Action issued in Application No. 2011-108385; Dated Feb. 26, 2013 (With Translation).

\* cited by examiner

*Primary Examiner* — Twyler Haskins
*Assistant Examiner* — Padma Haliyur
(74) *Attorney, Agent, or Firm* — Oliff PLC

(57) ABSTRACT

An image processing device includes an image input part inputting image data formed of a first type pixel in which a first color element is known, a second type pixel in which a second color element is known, and a third type pixel in which a third color element is known, a first color element interpolating part determining a first interpolation value of the first color element based on the first type pixels, a first convexoconcave structure calculating part calculating a first convexoconcave structure based on either of the second type pixels and the third type pixels, a first convexoconcave addition part adding the first convexoconcave structure to the first interpolation value to determine a second interpolation value, a first color range calculating part determining a range of the first color element based on the first type pixels, and a clip part determining a third interpolation value.

19 Claims, 14 Drawing Sheets

Fig. 4A

| j \ i | (i-2) | (i-1) | (i) | (i+1) | (i+2) |
|---|---|---|---|---|---|
| (j-2) | R | G | R | G | R |
| (j-1) | G | B | G | B | G |
| (j) | R | G | R | G | R |
| (j+1) | G | B | G | B | G |
| (j+2) | R | G | R | G | R |

Fig. 4B

| j \ i | (i-2) | (i-1) | (i) | (i+1) | (i+2) |
|---|---|---|---|---|---|
| (j-2) | R,Gr | G | R,Gr | G | R,Gr |
| (j-1) | G | B,Gb | G | B,Gb | G |
| (j) | R,Gr | G | R,Gr | G | R,Gr |
| (j+1) | G | B,Gb | G | B,Gb | G |
| (j+2) | R,Gr | G | R,Gr | G | R,Gr |

Fig. 4C

| j \ i | (i-2) | (i-1) | (i) | (i+1) | (i+2) |
|---|---|---|---|---|---|
| (j-2) | Cr,Gr | G | Cr,Gr | G | Cr,Gr |
| (j-1) | G | Cb,Gb | G | Cb,Gb | G |
| (j) | Cr,Gr | G | Cr,Gr | G | Cr,Gr |
| (j+1) | G | Cb,Gb | G | Cb,Gb | G |
| (j+2) | Cr,Gr | G | Cr,Gr | G | Cr,Gr |

Fig. 4D

| j \ i | (i-2) | (i-1) | (i) | (i+1) | (i+2) |
|---|---|---|---|---|---|
| (j-2) | Cr,Cb2,Gr | Cr2,Cb2,G | Cr,Cb2,Gr | Cr2,Cb2,G | Cr,Cb2,Gr |
| (j-1) | Cr2,Cb2,G | Cr2,Cb,Gb | Cr2,Cb2,G | Cr2,Cb,Gb | Cr2,Cb2,G |
| (j) | Cr,Cb2,Gr | Cr2,Cb2,G | Cr,Cb2,Gr | Cr2,Cb2,G | Cr,Cb2,Gr |
| (j+1) | Cr2,Cb2,G | Cr2,Cb,Gb | Cr2,Cb2,G | Cr2,Cb,Gb | Cr2,Cb2,G |
| (j+2) | Cr,Cb2,Gr | Cr2,Cb2,G | Cr,Cb2,Gr | Cr2,Cb2,G | Cr,Cb2,Gr |

Fig. 4E

| j \ i | (i-2) | (i-1) | (i) | (i+1) | (i+2) |
|---|---|---|---|---|---|
| (j-2) | RGB | RGB | RGB | RGB | RGB |
| (j-1) | RGB | RGB | RGB | RGB | RGB |
| (j) | RGB | RGB | RGB | RGB | RGB |
| (j+1) | RGB | RGB | RGB | RGB | RGB |
| (j+2) | RGB | RGB | RGB | RGB | RGB |

Fig. 5A

|   | (i-2) | (i-1) | (i) | (i+1) | (i+2) |
|---|---|---|---|---|---|
| (j-2) | R | G↑ | R | G↑ | R |
| (j-1) | G | B | G↑ | B | G |
| (j) | R | G↓ | R | G↓ | R |
| (j+1) | G | B | G↓ | B | G |
| (j+2) | R | G↓ | R | G↓ | R |

|   | (i-2) | (i-1) | (i) | (i+1) | (i+2) |
|---|---|---|---|---|---|
| (j-2) | R | G | R | G | R |
| (j-1) | G→ | B | →G← | B | →G |
| (j) | R | →G← | R | →G← | R |
| (j+1) | G→ | B | →G← | B | →G |
| (j+2) | R | G | R | G | R |

|   | (i-2) | (i-1) | (i) | (i+1) | (i+2) |
|---|---|---|---|---|---|
| (j-2) | R | G | R | G↘ | R |
| (j-1) | G | B | G↖ | B | G |
| (j) | R | G↖ | R | G↘ | R |
| (j+1) | G↖ | B | G↘ | B | G |
| (j+2) | R | G↘ | R | G | R |

|   | (i-2) | (i-1) | (i) | (i+1) | (i+2) |
|---|---|---|---|---|---|
| (j-2) | R | ↗G | R | G | R |
| (j-1) | G↙ | B | ↗G | B | G |
| (j) | R | G↙ | R | ↗G | R |
| (j+1) | G | B | G↙ | B | ↗G |
| (j+2) | R | G | R | G↙ | R |

| j \ i | (i−2) | (i−1) | (i) | (i+1) | (i+2) |
|---|---|---|---|---|---|
| (j−2) | R | G | R | G | R |
| (j−1) | G | B | G | B | G |
| (j) | R | G | R(i,j) | G | R |
| (j+1) | G | B | G | B | G |
| (j+2) | R | G | R | G | R |

Fig. 6B

| j \ i | (i−2) | (i−1) | (i) | (i+1) | (i+2) |
|---|---|---|---|---|---|
| (j−2) | Z | G | Z | G | Z |
| (j−1) | G | Z | G | Z | G |
| (j) | Z | G | Z(i,j) | G | Z |
| (j+1) | G | Z | G | Z | G |
| (j+2) | Z | G | Z | G | Z |

Fig. 6C

| j \ i | (i−2) | (i−1) | (i) | (i+1) | (i+2) |
|---|---|---|---|---|---|
| (j−2) | Z2 | G | Z2 | G | Z2 |
| (j−1) | G | Z2 | G | Z2 | G |
| (j) | Z2 | G | Z2(i,j) | G | Z2 |
| (j+1) | G | Z2 | G | Z2 | G |
| (j+2) | Z2 | G | Z2 | G | Z2 |

Fig. 6D

| j \ i | (i−2) | (i−1) | (i) | (i+1) | (i+2) |
|---|---|---|---|---|---|
| (j−2) | △ | G | △ | G | △ |
| (j−1) | G | △ | G | △ | G |
| (j) | △ | G | △(i,j) | G | △ |
| (j+1) | G | △ | G | △ | G |
| (j+2) | △ | G | △ | G | △ |

IMAGE PROCESSING DEVICE, STORAGE MEDIUM STORING IMAGE PROCESSING PROGRAM, AND ELECTRONIC CAMERA

CROSS REFERENCE TO RELATED APPLICATION

This application is based upon and claims the benefit of priority from Japanese Patent Application No. 2011-108385, filed on May 13, 2011, the entire contents of which is incorporated herein by reference.

BACKGROUND

1. Field

The present application relates to an image processing device, a storage medium storing an image processing program, and an electronic camera.

2. Description of the Related Art

In a commonly-used electronic camera, a color filter having one color element of any one of R, G and B is disposed to each pixel of a single image sensor to obtain color information. In this case, each pixel of a RAW image has only one color element of any one of R, G and B, so that color interpolation processing is performed based on another color element of peripheral pixels, thereby generating three color elements of R, G and B with respect to all pixels. However, when a G element at an R pixel position is interpolated and generated, for example, if the interpolation is performed based only on G pixels in a periphery of the R pixel, an image structure is not sharply resolved, which is a problem. In order to solve this problem, there has been proposed a color interpolation method in which a convexoconcave element calculated based on an R pixel or a B pixel is added to a G element interpolated and generated based on G pixels, thereby sharply resolving an image structure (refer to Japanese Unexamined Patent Application Publication No. 2000-244934, for example).

However, when the convexoconcave element calculated based on the R pixel or the B pixel is added to sharply resolve the image structure, there arises a problem such that the image structure becomes too sharp, resulting in that an unnatural ringing occurs.

SUMMARY

An image processing device includes an image input part inputting image data formed of, among a plurality of pixels each corresponding to any one of two-dimensionally arranged a first color element, a second color element and a third color element, a first type pixel whose first color element is known and whose second color element and third color element are unknown, a second type pixel whose second color element is known and whose first color element and third color element are unknown, and a third type pixel whose third color element is known and whose first color element and second color element are unknown, a first color element interpolating part determining, with respect a target pixel in which the first color element is unknown, a first interpolation value of the first color element by referring to the first type pixels in a neighborhood of the target pixel, a first convexoconcave structure calculating part calculating a first convexoconcave structure in the target pixel by referring to the target pixel and at least either of the second type pixels and the third type pixels in a neighborhood of the target pixel, a first convexoconcave addition part adding the first convexoconcave structure to the first interpolation value to determine a second interpolation value, a first color range calculating part determining a range of the first color element in the target pixel by referring to the first type pixels in the neighborhood of the target pixel, and a clip part determining a third interpolation value by clipping the second interpolation value to fall within the range.

Further, there are provided a second convexoconcave structure calculating part calculating a second convexoconcave structure in the target pixel by referring to the target pixel and at least either of the second type pixels and the third type pixels in the neighborhood of the target pixel, a second convexoconcave addition part adding the second convexoconcave structure to the first interpolation value to determine a fourth interpolation value, and an interpolation value selecting part selecting one of the third interpolation value and the fourth interpolation value, based on the range set by the first color range calculating part.

A non-transitory computer readable storage medium storing an image processing program causing a computer to execute color interpolation processing of inputting image data formed of, among a plurality of pixels each corresponding to any one of two-dimensionally arranged a first color element, a second color element and a third color element, a first type pixel whose first color element is known and whose second color element and third color element are unknown, a second type pixel whose second color element is known and whose first color element and third color element are unknown, and a third type pixel whose third color element is known and whose first color element and second color element are unknown, and generating image data in which each pixel includes the first color element, the second color element and the third color element, the non-transitory computer readable storage medium storing the image processing program includes a first color element interpolating step determining, with respect a target pixel in which the first color element is unknown in the input image data, a first interpolation value of the first color element by referring to the first type pixels in a neighborhood of the target pixel, a first convexoconcave structure calculating step calculating a first convexoconcave structure in the target pixel by referring to the target pixel and at least either of the second type pixels and the third type pixels in a neighborhood of the target pixel, a first convexoconcave addition step adding the first convexoconcave structure to the first interpolation value to determine a second interpolation value, a first color range calculating step determining a range of the first color element in the target pixel by referring to the first type pixels in the neighborhood of the target pixel, and a clip step determining a third interpolation value by clipping the second interpolation value to fall within the range.

Further, there are provided a second convexoconcave structure calculating step calculating a second convexoconcave structure in the target pixel by referring to the target pixel and at least either of the second type pixels and the third type pixels in the neighborhood of the target pixel, a second convexoconcave addition step adding the second convexoconcave structure to the first interpolation value to determine a fourth interpolation value, and an interpolation value selecting step selecting one of the third interpolation value and the fourth interpolation value, based on the range set by the first color range calculating step.

An electronic camera mounting the image processing device includes an imaging part making a subject light incident thereon through an optical system, photographing an image formed of a plurality of pixels in which each pixel has one color element of any one of a plurality of color elements, and outputting the image to the image processing device, and a recording part recording the image output by the image processing device, in a recording medium.

According to the present invention, it is possible to sharply resolve an image structure, and to suppress an unnatural ringing.

BRIEF DESCRIPTION OF THE DRAWINGS

FIG. 4A to FIG. 4E are diagrams illustrating examples of pixel arrangement of each data.

FIG. 5A to FIG. 5D are diagrams illustrating a direction determination method of image structure.

FIG. 6A to FIG. 6D are diagrams illustrating examples of arrangement of a target pixel and neighboring pixels.

DETAILED DESCRIPTION OF THE EMBODIMENTS

Hereinafter, embodiments of an image processing device, a storage medium storing an image processing program, and an electronic camera according to the present invention will be described in detail by using the drawings. Note that in the embodiments described hereinbelow, explanation will be made by citing an example of electronic camera on which an image processing device that operates based on an image processing program according to the present invention is mounted, but, there is no problem if a program for a personal computer that performs image processing by inputting already photographed image data or a stand-alone image processing device is employed.

[Configuration and Basic Operation of Electronic Camera 101]

Figure 1:
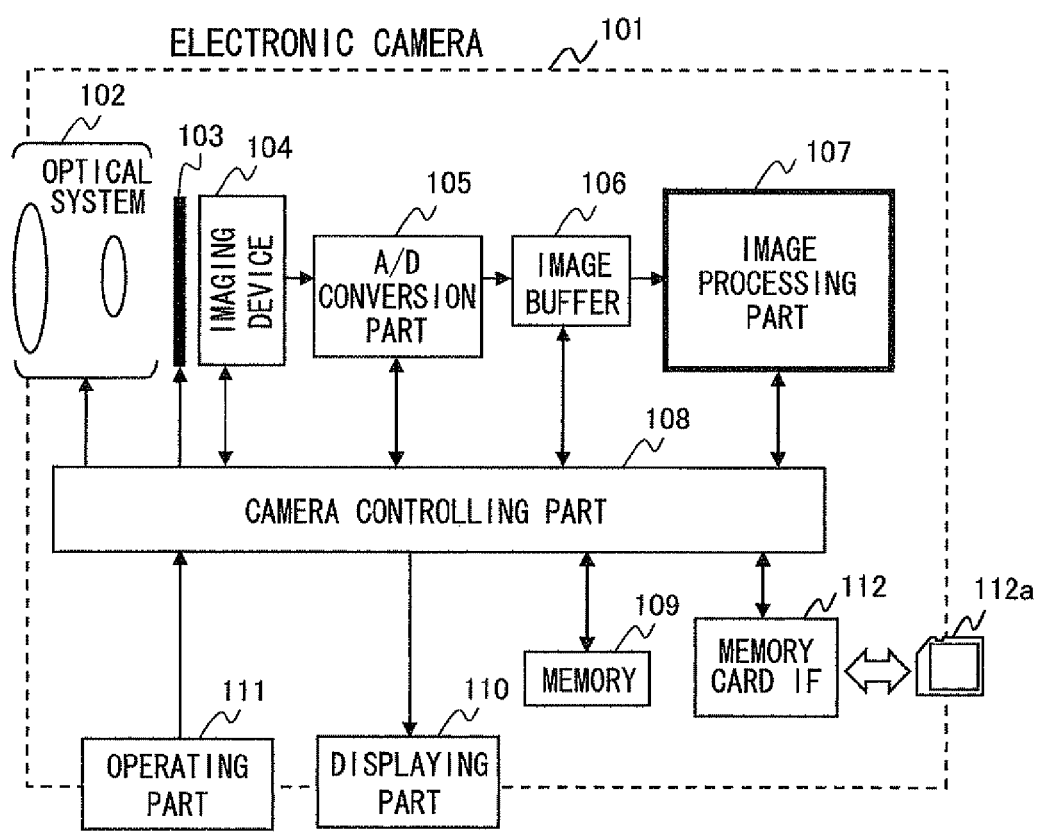
FIG. 1 is a block diagram illustrating a configuration of an electronic camera 101 according to each embodiment.

First, an entire configuration and a basic operation of an electronic camera 101 common to each embodiment will be described. FIG. 1 is a block diagram illustrating a configuration of the electronic camera 101, in which the electronic camera 101 is made up of an optical system 102, a mechanical shutter 103, an imaging device 104, an A/D conversion part 105, an image buffer 106, an image processing part 107, a camera controlling part 108, a memory 109, a displaying part 110, an operating part 111, and a memory card IF (interface) 112. Here, the image processing part 107 is a block corresponding to an image processing device on which an image processing program according to the present invention is mounted.

In FIG. 1, a subject light incident on the optical system 102 is incident on a light-receiving surface of the imaging device 104 via the mechanical shutter 103. Here, the optical system 102 is made up of plural pieces of lenses such as a zoom lens and a focus lens, a lens driving part, an aperture and the like, in which the zoom lens, the focus lens, or the aperture and the like are controlled according to a photographing condition, in accordance with an instruction from the camera controlling part 108.

The imaging device 104 is made up of a single image sensor, and on the light-receiving surface thereof, a plurality of pixels each having a photoelectric conversion part are two-dimensionally arranged. Further, in order to obtain color information, on each pixel, a color filter of one color of any one of three colors of R, G and B is disposed in a predetermined arrangement, for example, and the imaging device 104 outputs, for each pixel, an image signal having a color element of one color of any one of three colors of R, G and B. Note that in the present embodiment, a color filter array of Bayer format is assumed to be disposed.

The A/D conversion part 105 converts, for each pixel, an image signal output by the imaging device 104 into a digital value, and temporary stores, in the image buffer 106, image data corresponding to a piece of photographed image. For example, when a resolution of the imaging device 104 is 1000 pixels×1000 pixels, image data for a million pixels is taken into the image buffer 106. At this time, the image data taken into the image buffer 106 is called as RAW data, and is image data of Bayer format in which each pixel has one color element of any one of R, G and B.

The image buffer 106 is made up of a volatile high-speed memory, which temporarily stores the photographed image output by the A/D conversion part 105, and in addition to that, it is also used as a buffer memory when the image processing part 107 performs image processing. Alternatively, the image buffer 106 is also used as a buffer for display when a photographed image and an already photographed image saved in the memory card 112a connected to the memory card IF 112 are displayed on the displaying part 110.

The image processing part 107 performs, on the RAW data taken into the image buffer 106, white balance processing, color interpolation processing, gamma correction processing, chroma enhancement processing, edge enhancement processing or the like. Further, the image processing part 107 performs, in accordance with a setting of the electronic camera 101, compression processing of the photographed image using an image compression method based on the JPEG standard and the like, to thereby output JPEG data. Note that a configuration of the image processing part 107 will be described later in detail.

The camera controlling part 108 is made up of a CPU that operates in accordance with a program stored inside thereof, and controls an entire operation of the electronic camera 101. For example, the camera controlling part 108 sets a photographing mode of the electronic camera 101 in accordance with operations of a photographing mode selection dial and a release button that form the operating part 111, and performs a lens control and an aperture control of the optical system 102 when the release button is pressed down to open/close the mechanical shutter 103, to thereby capture a subject image using the imaging device 104. Further, the camera controlling part 108 reads an analog image signal from the imaging device 104, converts the image signal into a digital value in the A/D conversion part 105, and takes the image data (RAW data) corresponding to one screen into the image buffer 106. Further, the camera controlling part 108 instructs the image processing part 107 to perform image processing such as the white balance processing and the color interpolation processing, on the RAW data taken into the image buffer 106, adds a predetermined file name and header information to the image data after being subjected to the image processing (JPEG data, for example), and saves the resultant in the memory card 112a via the memory card IF 112.

The memory 109 is made up of a nonvolatile semiconductor memory such as a flash memory, in which parameters of the photographing mode, exposure information, focus information and the like of the electronic camera 101 are stored, and the camera controlling part 108 controls the operation of the electronic camera 101 by referring to these parameters. Note that these parameters are appropriately updated in accordance with an operation of user performed through the operating part 111.

The displaying part 110 is made up of a liquid crystal display or the like, and the photographed image, a setting menu screen necessary for the operation of the electronic camera 101 and the like are displayed by the camera controlling part 108.

The operating part 111 is made up of a power button, the release button, the photographing mode selection dial, a cursor button, and so on. A user uses the electronic camera 101 by operating these operation buttons. Note that operation information of these operation buttons is output to the camera controlling part 108, and the camera controlling part 108 controls the entire operation of the electronic camera 101 in accordance with the operation information input from the operating part 111.

The memory card IF 112 is an interface to connect the memory card 112a to the electronic camera 101, and the camera controlling part 108 reads/writes the image data from/into the memory card 112a via the memory card IF 112.

The above is the explanation of the configuration and the basic operation of the electronic camera 101.

[Configuration and Operation of Image Processing Part 107]

Figure 2:
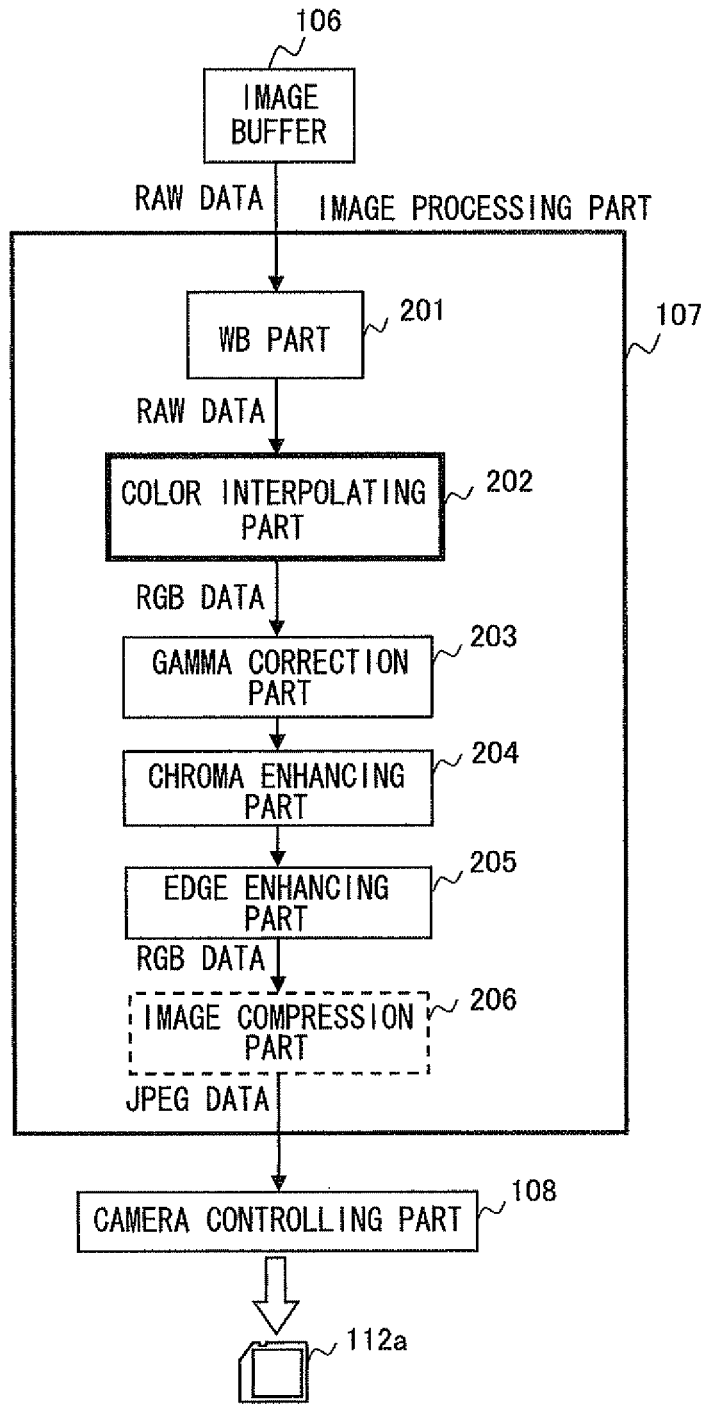
FIG. 2 is a block diagram illustrating a configuration of an image processing part 107 of the electronic camera 101.

Next, a configuration and an operation of the image processing part 107 will be described in detail. FIG. 2 is a block diagram illustrating an example of configuration of the image processing part 107. In FIG. 2, the image processing part 107 is made up of a white balance part (WB part) 201, a color interpolating part 202, a gamma correction part 203, a chroma enhancing part 204, an edge enhancing part 205, and an image compression part 206. Note that in FIG. 2, the same reference numerals as those in FIG. 1 denote the same elements. Hereinafter, respective parts of the image processing part 107 will be described in detail.

The white balance part 201 determines coefficients (white balance gains) for adjusting a balance of respective colors of R, G and B, so that a part of achromatic color of a subject is photographed as an image of achromatic color, and multiplies the coefficients to RAW data, thereby performing white balance adjustment. Note that there is also a case where processing of converting a characteristic into a gradation characteristic (gamma characteristic) suitable for subsequent color interpolation processing is performed on the RAW data after being subjected to the white balance processing. Further, in FIG. 2, it is set that RAW data means image data of Bayer format in which each pixel has a value of one color of any one of three colors of R, G and B, and, for example, RAW data read from the image buffer 106 and RAW data before and after the processing in the WB part 201 are not the same. In like manner, in FIG. 2, it is set that RGB data means image data in which each pixel has values of color elements of three colors of R, G and B, and, for example, RGB data output by the color interpolating part 202 and RGB data output by the edge enhancing part 205 are not the same.

The color interpolating part 202 performs processing of converting the RAW data in which each pixel has only a value of one color of any of three colors of R, G and B into the RGB data in which each pixel has values of three colors of R, G and B.

The gamma correction part 203 performs gradation conversion processing on the RGB data output by the color interpolating part 202.

The chroma enhancing part 204 performs processing of enhancing a chroma of the RGB data so that the photographed image becomes an image with a vivid color.

The edge enhancing part 205 performs processing of enhancing an edge of the image of the RGB data output by the chroma enhancing part 204.

The image compression part 206 performs image compression processing on the image output by the edge enhancing part 205 in a predetermined format such as the JPEG standard. The image data after being subjected to the image compression processing (JPEG data, for example) is saved, as a photographed image, in the memory card 112a connected to the memory card IF 112 via the camera controlling part 108. Note that when the image compression processing is not performed, the image data before performing the image compression processing is saved in the memory card 112a.

As described above, the image processing part 107 performs, on the RAW data taken into the image buffer 106, the white balance processing, the color interpolation processing, the gamma correction processing, the chroma enhancement processing, the edge enhancement processing, or the image compression processing, and outputs the resultant to the camera controlling part 108.

Here, the characteristic of the invention of the present application lies in the processing of the color interpolating part 202 in the image processing part 107, and there is no problem if another processing is omitted or a method other than the above-described method is used. For example, there is no problem to set such that the processing of the chroma enhancing part 204 is omitted, or the image compression processing is not performed in the image compression part 206.

Next, a configuration and processing of the color interpolating part 202 will be described by citing some examples.

First Embodiment

Figure 3:
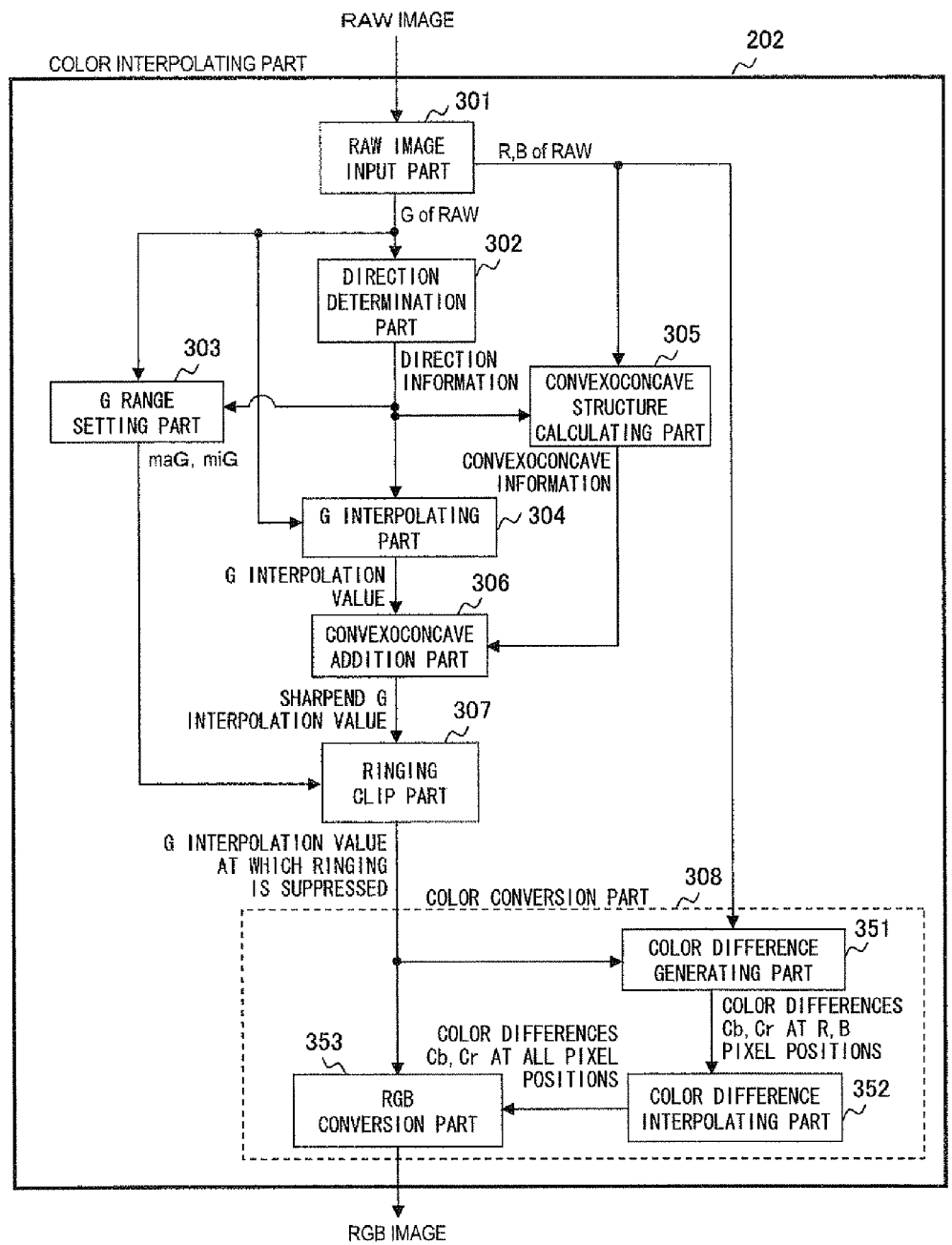
FIG. 3 is a block diagram illustrating a configuration and a flow of processing of a color interpolating part 202 of an electronic camera 101 according to a first embodiment.

FIG. 3 is a block diagram illustrating the configuration and the flow of processing of the color interpolating part 202 in the electronic camera 101 according to the first embodiment. The color interpolating part 202 processes the RAW data input from the WB part 201 in FIG. 2, to thereby generate RGB data with respect to each pixel.

In FIG. 3, the color interpolating part 202 is made up of a RAW image input part 301, a direction determination part 302, a G range setting part 303, a G interpolating part 304, a convexoconcave structure calculating part 305, a convexoconcave addition part 306, a ringing clip part 307, and a color conversion part 308.

Here, the RAW data input into the color interpolating part 202 will be described. The RAW data is image data of Bayer format as illustrated in FIG. 4A, for example, and each pixel has a pixel value of one color of any one of three colors of R, G and B. Note that FIG. 4A is a diagram illustrating an example of Bayer format of 5×5 pixels, for easier understanding, in which 5 rows in a vertical direction (row direction (j)) and 5 columns in a horizontal direction (column direction (i)) are disposed. For example, in (j−2)-th row, (j)-th row and (j+2)-th row, R pixels and G pixels are alternately arranged, and in (j−1)-th row and (j+1)-th row, G pixels and B pixels are alternately arranged. Note that in FIG. 4A, i and j are integers indicating coordinate positions, and, for example, R (i, j) indicates an R element value of R pixel (i, j) at the j-th row and the i-th column, B (i−1, j−1) indicates a B element value of B pixel (i−1, j−1) at the (j−1)-th row and the (i−1)-th column, and G (i, j+1) indicates a G element value of G pixel (i, j+1) at the (j+1)-th row and the (i)-th column. Further, in the explanation in the respective drawings hereinafter, denotation of (i, j) represents the pixel coordinate, similar to FIG. 4A. Note that in the present embodiment, the RAW data of Bayer format is used, but, regarding RAW data of another format such as delta format, it is also possible to achieve the same effect as that of the image processing device according to the present embodiment, by performing similar processing.

In FIG. 3, the RAW data is input into the color interpolating part 202 from the image buffer 106, and the color interpolating part 202 performs the following processing.

The RAW image input part 301 inputs, from the image buffer 106, the RAW data of Bayer format as illustrated in FIG. 4A. Subsequently, the RAW image input part 301 outputs a pixel value at a G pixel position (referred to as a G pixel value) to the direction determination part 302, the G range setting part 303, and the G interpolating part 304, and outputs a pixel value at an R pixel position (referred to as an R pixel value) and a pixel value at a B pixel position (referred to as a B pixel value) to the convexoconcave structure calculating part 305, and a color difference generating part 351 of the color conversion part 308.

The direction determination part 302 performs direction determination processing of image structure with respect to each R pixel position (or each B pixel position) of the RAW image, using a publicly-known method. For example, when an R pixel (i, j) in FIG. 4A is set as a target pixel, the direction determination processing at the R pixel (i, j) is performed in the following manner. Here, difference values of adjacent pixels in respective vertical, horizontal, lower right diagonal (direction from upper left to lower right), and upper right diagonal (direction from lower left to upper right) directions are referred to as CV, CH, CD1, and CD2, respectively.

In (equation 1), the difference value of adjacent pixels CV in the vertical direction is determined by using eight G pixels in the left and right columns of the R pixel (i, j) being the target pixel which is set as a center, as illustrated in FIG. 5A. Note that an arrow mark in each drawing of FIG. 5A to FIG. 5D indicates two pixels to be paired for determining the difference value.

$$CV = (|G(i-1, j-2) - G(i-1, j)| + \quad \text{(Equation 1)}$$
$$|G(i-1, j) - G(i-1, j+2)| +$$
$$|G(i, j-1) - G(i, j+1)| +$$
$$|G(i+1, j-2) - G(i+1, j)| +$$
$$|G(i+1, j) - G(i+1, j+2)|)/5$$

In (equation 2), the difference value of adjacent pixels CH in the horizontal direction is determined by using eight G pixels in the rows above and below the R pixel (i, j) being the target pixel which is set as a center, as illustrated in FIG. 5B.

$$CH = (|G(i-2, j-1) - G(i, j-1)| + \quad \text{(Equation 2)}$$
$$|G(i, j-1) - G(i+2, j-1)| +$$
$$|G(i-1, j) - G(i+1, j)| +$$
$$|G(i-2, j+1) - G(i, j+1)| +$$
$$|G(i, j+1) - G(i+2, j+1)|)/5$$

In (equation 3), the difference value of adjacent pixels CD1 in the lower right diagonal (from upper left to lower right) direction is determined by using eight G pixels in the direction from lower left to upper right in which the R pixel (i, j) being the target pixel is set as a center, as illustrated in FIG. 5C.

$$CD1=(|G(i,j-1)-G(i+1,j)|+|G(i-1,j)-G(i,j+1)|+|G(i-2,j+1)-G(i-1,j+2)|+|G(i+1,j-2)-G(i+2,j-1)|)/4 \quad \text{(Equation 3)}$$

In (equation 4), the difference value of adjacent pixels CD2 in the upper right diagonal (from lower left to upper right) direction is determined by using eight G pixels in the direction from upper left to lower right in which the R pixel (i, j) being the target pixel is set as a center, as illustrated in FIG. 5D.

$$CD2=(|G(i,j-1)-G(i-1,j)|+|G(i+1,j)-G(i,j+1)|+|G(i-1,j-2)-G(i-2,j-1)|+|G(i+2,j+1)-G(i+1,j+2)|)/4 \quad \text{(Equation 4)}$$

Here, the equations for determining the difference values of adjacent pixels CV, CH, CD1, and CD2 are not limited to the above-described equations, and further, it is also possible to determine the values by referring to not only the G pixels but also R pixels and B pixels. Note that any method can be employed as long as it can determine the direction of image structure.

Further, with the use of (equation 5) and (equation 6), a vertical or horizontal direction determination result HV (i, j) and a diagonal direction determination result DI (i, j) are calculated with respect to each R pixel position (or each B pixel position) of the RAW image. Concretely, the direction of image structure is determined by using the difference values of adjacent pixels CV, CH, CD1, and CD2. For example, the vertical or horizontal direction determination result HV (i, j) is determined in accordance with whether or not a difference between the difference value of adjacent pixels CV in the vertical direction and the difference value of adjacent pixels CH in the horizontal direction is greater than a previously set threshold value TH. When CV is greater than CH, the image structure is one of horizontal direction, and when CV is smaller than CH, the image structure is one of vertical direction. However, in order to prevent a determination error due to a fluctuation of pixel value caused by a noise in the RAW image, for example, the threshold value TH is set, and when the difference between CV and CH is equal to or less than the threshold value TH, it is determined that the image structure is one of neither vertical nor horizontal. In like manner, when CD1 is greater than CD2, the image structure takes CD2, and when CD1 is smaller than CD2, the image structure takes CD1. However, in order to prevent a determination error, the threshold value TH is set, and when a difference between CD1 and CD2 is equal to or less than the threshold value TH, it is determined that the image structure is one of neither CD1 nor CD2.

$$HV(i, j) = \begin{cases} -1 & \text{if } (CV - CH < -TH) \quad \text{(Image structure is of vertical)} \\ 1 & \text{if } (CV - CH > TH) \quad \text{(Image structure is of horizontal)} \\ 0 & \text{if } (|CV - CH| \leq TH) \quad \text{(Image structure is of neither vertical nor horizontal)} \end{cases} \quad \text{(Equation 5)}$$

$$DI(i, j) = \begin{cases} -1 & \text{if } (CD1 - CD2 < -TH) \quad \text{(Image structure is of } CD1\text{)} \\ 1 & \text{if } (CD1 - CD2 > TH) \quad \text{(Image structure is of } CD2\text{)} \\ 0 & \text{if } (|CD1 - CD2| \leq TH) \quad \text{(Image structure is of neither } CD1 \text{ nor } CD2\text{)} \end{cases} \quad \text{(Equation 6)}$$

Here, TH is the previously set threshold value, and is set to a value which is about three times a standard deviation of the fluctuation of pixel value due to the noise in the RAW image, for example.

The determination of image structure can be performed as described above. Note that $-1, 0, 1$ in the vertical or horizontal direction determination result HV $(i, j)$ and the diagonal direction determination result DI $(i, j)$ are flags indicating the direction determination results.

The G range setting part 303 calculates, using (equation 7) and (equation 8), a maximum value maG $(i, j)$ of G value and a minimum value miG $(i, j)$ of G value with respect to each R pixel position (or each B pixel position) of the RAW image. Concretely, when the image structure determined by the (equation 5) and the (equation 6) is of vertical, a maximum value or a minimum value of G pixels above and below the target pixel $(i, j)$ is set as the maximum value maG $(i, j)$ or the minimum value miG $(i, j)$ of the target pixel $(i, j)$, and when the image structure is of horizontal, a maximum value or a minimum value of G pixels on the left and right of the target pixel $(i, j)$ is set as the maximum value maG $(i, j)$ or the minimum value miG $(i, j)$ of the target pixel $(i, j)$. Further, when the image structure is of neither vertical nor horizontal, a maximum value or a minimum value of G pixels above and below and on the left and right of the target pixel $(i, j)$ is set as the maximum value maG $(i, j)$ or the minimum value miG $(i, j)$ of the target pixel $(i, j)$.

$$maG(i, j) = \begin{cases} \text{if } (HV(i, j) = -1) \quad \text{(When image structure is of vertical)} \\ \max(G(i, j-1), G(i, j+1)) \\ \text{if } (HV(i, j) = 1) \quad \text{(When image structure is of horizontal)} \\ \max(G(i-1, j), G(i+1, j)) \\ \text{if } (HV(i, j) = 0) \quad \text{(When it cannot be said that image structure is of vertical or horizontal)} \\ \max(G(i-1, j), G(i+1, j), G(i, j-1), G(i, j+1)) \end{cases} \quad \text{(Equation 7)}$$

$$miG(i, j) = \begin{cases} \text{if } (HV(i, j) = -1) \quad \text{(When image structure is of vertical)} \\ \min(G(i, j-1), G(i, j+1)) \\ \text{if } (HV(i, j) = 1) \quad \text{(When image structure is of horizontal)} \\ \min(G(i-1, j), G(i+1, j)) \\ \text{if } (HV(i, j) = 0) \quad \text{(When it cannnot be said that image structure is of vertical or horizontal)} \\ \min(G(i-1, j), G(i+1, j), G(i, j-1), G(i, j+1)) \end{cases} \quad \text{(Equation 8)}$$

Here, max ( ) represents a maximum value in ( ), and min ( ) represents a minimum value in ( ).

The G interpolating part 304 calculates, with the use of (equation 9), for example, a G interpolation value G_itpl $(i, j)$ with respect to each R pixel position (or each B pixel position) of the RAW image. Concretely, when the image structure determined by the (equation 5) and the (equation 6) is of vertical, an average value of two G pixels positioned above and below the target pixel $(i, j)$ is set as the G interpolation value G_itpl $(i, j)$, and when the image structure is of horizontal, an average value of two G pixels positioned on the left and right of the target pixel $(i, j)$ is set as the G interpolation value G_itpl $(i, j)$. Further, when the image structure is of neither vertical nor horizontal, an average value of four G pixels positioned above and below and on the left and right of the target pixel $(i, j)$ is set as the G interpolation value G_itpl $(i, j)$.

$$G\_itpl(i, j) = \begin{cases} \text{if } (HV(i, j) = -1) \quad \text{(When image structure is of vertical)} \\ (G(i, j-1) + G(i, j+1))/2 \\ \text{if } (HV(i, j) = 1) \quad \text{(When image structure is of horizontal)} \\ (G(i-1, j) + G(i+1, j))/2 \\ \text{if } (HV(i, j) = 0) \quad \text{(When it cannot be said that image structure is of vertical or horizontal)} \\ (G(i-1, j) + G(i+1, j) + G(i, j-1) + G(i, j+1))/4 \end{cases} \quad \text{(Equation 9)}$$

The convexoconcave structure calculating part 305 calculates a convexoconcave structure $\Delta(i, j)$ using (equation 11), for example. Note that $\Delta(i, j)$ is a convexoconcave element value at the R pixel position (or the B pixel position) $(i, j)$ of the RAW image, as illustrated in FIG. 6D.

Here, Z2 $(i, j)$ is a value calculated by (equation 10) at the R pixel position (or the B pixel position) $(i, j)$ of the RAW image, as illustrated in FIG. 6C, and Z $(i, j)$ is the R pixel value or the B pixel value of the RAW image at the pixel position $(i, j)$, as illustrated in FIG. 6B. Note that FIG. 6A illustrates the same RAW image of Bayer format as that of FIG. 4A.

$$Z2(k, l) = \begin{cases} (2 \times Z(k, l) + Z(k-1, l-1) + Z(k+1, l+1))/4 & \text{if } (DI(k,l) = -1) \text{ (When image structure is of first diagonal direction)} \\ (2 \times Z(k, l) + Z(k+1, l-1) + Z(k-1, l+1))/4 & \text{if } (DI(k,l) = 1) \text{ (When image structure is of second diagonal direction)} \\ (4 \times Z(k, l) + Z(k-1, l-1) + Z(k+1, l+1) + Z(k+1, l-1) + Z(k-1, l+1))/8 & \text{if } (DI(k,l) = 0) \text{ (When it cannot be said that image structure is of first diagonal direction or second diagonal direction)} \end{cases}$$ (Equation 10)

$$\Delta(i, j) = \begin{cases} (Z2(i, j) - Z2(i, j-2) - Z2(i, j+2))/4 & \text{if } (HV(i,j) = -1) \text{ (When image structure is of vertical)} \\ (Z2(i, j) - Z2(i-2, j) - Z2(i+2, j))/4 & \text{if } (HV(i,j) = 1) \text{ (When image structure is of horizontal)} \\ (2 \times Z2(i, j) - Z2(i, j-2) - Z2(i, j+2) - Z2(i-2, j) - Z2(i+2, j))/8 & \text{if } (HV(i,j) = 0) \text{ (When it cannot be said that image structure is of vertical or horizontal)} \end{cases}$$ (Equation 11)

The convexoconcave addition part 306 calculates a sharpened second G interpolation value G_itpl2 (i, j) with respect to the R pixel position (or the B pixel position) (i, j) of the RAW image by adding the convexoconcave element (Δ (i, j)) to the G interpolation value (G_itpl (i, j)) through (equation 12), for example.

$$G\_itpl2(i,j) = G\_itpl(i,j) - k \times \Delta(i,j)$$ (Equation 12)

Here, k is a parameter for controlling the degree of convexoconcave addition, and may be set to about 1, for example.

The ringing clip part 307 calculates a third G interpolation value G_itpl3 (i, j) after a ringing is clipped, with respect to the R pixel position (or the B pixel position) (i, j) of the RAW image through (equation 13). Concretely, the ringing clip part 307 compares the maximum value maG of G value and the minimum value miG of G value previously determined through the (equation 7) and the (equation 8), and the second G interpolation value G_itpl2, in which when the second G interpolation value G_itpl2 is equal to or less than miG, miG is set to the third G interpolation value G_itpl3, and when the second G interpolation value G_itpl2 is equal to or greater than maG, maG is set to the third G interpolation value G_itpl3. Further, when the second G interpolation value G_itpl2 is between maG and miG, the second G interpolation value G_itpl2 is set to the third G interpolation value G_itpl3.

$$G\_itpl3(i, j) = \begin{cases} miG(i, j) & \text{if } (G\_itpl2(i, j) \leq miG(i, j)) \\ maG(i, j) & \text{if } (G\_itpl2(i, j) \geq maG(i, j)) \\ G\_itpl2(i, j) & \text{if } (miG(i, j) < G\_itpl2(i, j) < maG(i, j)) \end{cases}$$ (Equation 13)

As described above, the color interpolating part 202 can input the RAW image in FIG. 4A, and obtain the third G interpolation value G_itpl3 at the R pixel position (or the B pixel position) (i, j) of the RAW image as illustrated in FIG. 4B. Note that in FIG. 4B, Gr indicates the third G interpolation value G_itpl3 at the R pixel position, and Gb indicates the third G interpolation value G_itpl3 at the B pixel position. Further, denotation will be made in a similar manner, also in FIG. 4C and FIG. 4D.

The processing of the color conversion part 308 to be explained hereinafter is one of publicly-known techniques of generating RGB data, which is generally performed.

The color conversion part 308 uses the third G interpolation value G_itpl3 at the R pixel position (or the B pixel position) (i, j) of the RAW image output by the ringing clip part 307, and the R pixel value and the B pixel value output by the RAW image input part 301, to thereby determine RGB data of all pixels. In an example of FIG. 3, the color conversion part 308 has the color difference generating part 351, a color difference interpolating part 352, and an RGB conversion part 353.

The color difference generating part 351 uses the third G interpolation value G_itpl3 at the R pixel position (or the B pixel position) (i, j) of the RAW image output by the ringing clip part 307, and the R pixel value and the B pixel value output by the RAW image input part 301, to thereby generate each of color differences Cr, Cb at the R pixel position (or the B pixel position) (i, j) through the following equations.

Regarding Cr (i, j) at the R pixel position $$Cr(i,j) = R(i,j) - G\_itpl3(i,j)$$

Regarding Cb (i, j) at the B pixel position $$Cb(i,j) = B(i,j) - G\_itpl3(i,j)$$

Here, as illustrated in FIG. 4B, R (i, j) and B (i, j) are the R pixel value and the B pixel value at the R pixel position (or the B pixel position) (i, j) output by the RAW image input part 301. As above, the color difference generating part 351 generates each of the color differences Cr (i, j), Cb (i, j) at the R pixel position (or the B pixel position) (i, j), as illustrated in FIG. 4C.

The color difference interpolating part 352 performs up-sampling of the color differences Cr, Cb at the R pixel position (or the B pixel position) determined by the color difference generating part 351, thereby generating Cb2 (i, j), Cr2 (i, j) with respect to all pixels. For example, at the R pixel position, the color difference Cb is determined since the color difference Cr has already been determined, at the B pixel position, the color difference Cr is determined since the color difference Cb has already been determined, and at the G pixel position, the color difference Cr and the color difference Cb are determined. Note that the method may employ a publicly-known interpolation method, and the color differences can be determined by a linear interpolation, as in the following respective equations, for example.

At the R pixel position (i, j) of the RAW image $$Cb2(i,j) = (Cb(i-1,j-1) + Cb(i-1,j+1) + Cb(i+1,j-1) + Cb(i+1,j+1))/4$$

$$Cr2(i,j) = Cr(i,j)$$

At the B pixel position (1, j) of the RAW image $$Cr2(i,j) = (Cr(i-1,j-1) + Cr(i-1,j+1) + Cr(i+1,j-1) + Cr(i+1,j+1))/4$$

$$Cb2(i,j) = Cb(i,j)$$

At the G pixel position (i, j) horizontally adjacent to the R pixel position of the RAW image $$Cr2(i,j) = (Cr(i-1,j) + Cr(i+1,j))/2$$

$$Cb2(i,j) = (Cb(i,j-1) + Cb(i,j+1))/2$$

At the G pixel position (i, j) horizontally adjacent to the B pixel position of the RAW image $$Cb2(i,j)=(Cb(i-1,j)+Cb(i+1,j))/2$$

$$Cr2(i,j)=(Cr(i,j-1)+Cr(i,j+1))/2$$

As described above, the color difference interpolating part 352 generates each of Cb2 (i, j) and Cr2 (i, j) with respect to all pixels, as illustrated in FIG. 4D.

The RGB conversion part 353 generates an R value (Rrgb (i, j)), a G value (Grgb (i, j)), and a B value (Brgb (i, j)) with respect to all pixels (i, j) through the following respective equations.

At the R pixel position (i, j) of the RAW image, only the calculation of Brgb (i, j) is practically required.

$$Rrgb(i,j)=G\_itpl3(i,j)+Cr(i,j)=R(i,j)$$

$$Brgb(i,j)=G\_itpl3(i,j)+Cb2(i,j)$$

$$Grgb(i,j)=G\_itpl3(i,j)$$

At the B pixel position (i, j) of the RAW image, only the calculation of Rrgb (i, j) is practically required.

$$Rrgb(i,j)=G\_itpl3(i,j)+Cr2(i,j)$$

$$Brgb(i,j)=G\_itpl3(i,j)+Cb(i,j)=B(i,j)$$

$$Grgb(i,j)=G\_itpl3(i,j)$$

At the G pixel position (i, j) of the RAW image, only the calculation of Rrgb (i, j) and Brgb (i, j) is practically required.

$$Rrgb(i,j)=G(i,j)+Cr2(i,j)$$

$$Brgb(i,j)=G(i,j)+Cb2(i,j)$$

$$Grgb(i,j)=G(i,j)$$

As described above, the RGB conversion part 353 can generate the RGB data with respect to all pixels, as illustrated in FIG. 4E.

As has been described above, the color interpolating part 202 outputs the RAW data input by the RAW image input part 301 by converting the data into the RGB data. Particularly, in the present embodiment, by interpolating the G value at the R pixel position (or the B pixel position) of the RAW image in accordance with the image structure, the image structure can be sharply resolved, and by clipping the ringing element in the ringing clip part 307, an unnatural ringing can be suppressed.

Note that as has been described in FIG. 2, the RGB data generated in the color interpolating part 202 is subjected to the image processing such as the gamma correction, the chroma enhancement, the edge enhancement or noise reduction in the image processing part 107, and is then displayed on the displaying part 110 by the camera controlling part 108, and JPEG data after being subjected to the image compression processing such as JPEG is saved in the memory card 112*a*.

Here, description will be made on a relation between the respective parts of the present embodiment and the claims. The present embodiment illustrates the example of Bayer format, so that the G element in the Bayer format corresponds to a first color element, and the R element and the B element correspond to a second color element and a third color element, respectively. In this case, a first type pixel whose first color element is known and whose second color element and third color element are unknown corresponds to the G pixel, and a second type pixel whose second color element is known and whose first color element and third color element are unknown and a third type pixel whose third color element is known and whose first color element and second color element are unknown correspond to the R pixel and the B pixel, respectively. Further, a target pixel in which the first color element is unknown corresponds to the R pixel or the B pixel. Further, the G interpolating part 304 corresponds to a first color element interpolating part, which refers to G pixels in the neighborhood of the target pixel to generate an interpolation value of G element G_itpl in the target pixel as a first interpolation value. The convexoconcave structure calculating part 305 corresponds to a first convexoconcave structure calculating part, which refers to the target pixel and at least either of R pixels or B pixels in the neighborhood of the target pixel to calculate a first convexoconcave structure. The convexoconcave addition part 306 corresponds to a first convexoconcave addition part, which adds the first convexoconcave structure Δ to the G element interpolation value G_itpl to generate a second interpolation value of G element (G_itpl2). The G range setting part 303 corresponds to a first color range calculating part, which refers to G pixels in the neighborhood of the target pixel to determine a range of G element in the target pixel. The ringing clip part 307 corresponds to a clip part, which generates a third interpolation value of G element (G_itpl3) by clipping the second interpolation value of G element (G_itpl2) to make the value fall within a range of the G element.

Here, in the above-described embodiment, the color conversion part 308 is designed to generate and output the RGB data, but, it may be designed to output luminance and color difference image data or to generate RGB data in FIG. 4E from image data in FIG. 4B without generating color differences. Alternatively, it is also possible to design such that the image data is converted into another image data format capable of being converted by various publicly-known color conversion expressions to be output. In any case, in the present embodiment, by conducting the interpolation in accordance with the image structure, the image structure is sharply resolved, and the unnatural ringing is suppressed, to thereby determine the G value at the R pixel position (or the B pixel position) of the RAW image, as illustrated in FIG. 4B, so that it is possible to achieve a similar effect to that of the above-described embodiment, regardless of the subsequent processing performed by the color conversion part 308.

Further, in the above-described embodiment, the convexoconcave structure calculating part 303 uses Z2 (added value of the R value at the R pixel position and the B value at the B pixel position) when determining the convexoconcave element Δ (i, j), but, it may also use Z (value of either the R value at the R pixel position or the B value at the B pixel position), instead of Z2. Generally, when there is chromatic aberration, the use of Z2 stabilizes an image quality, but, the use of Z makes the processing easier, and thus is suitable for a case where a camera in which a processing capability of CPU is low is employed, a case where high-speed processing such as continuous photographing is required, and the like.

[Effect]

Next, an effect of the electronic camera 101 according to the first embodiment will be described. Here, description will be made on an example of image in which the processing of the ringing clip part 307 is invalid and an example of image in which the processing is valid, and it is explained that the electronic camera 101 according to the first embodiment can achieve favorable results in the both cases.

(Example of Image in which the Ringing Clip is Invalid)

Figure 7:
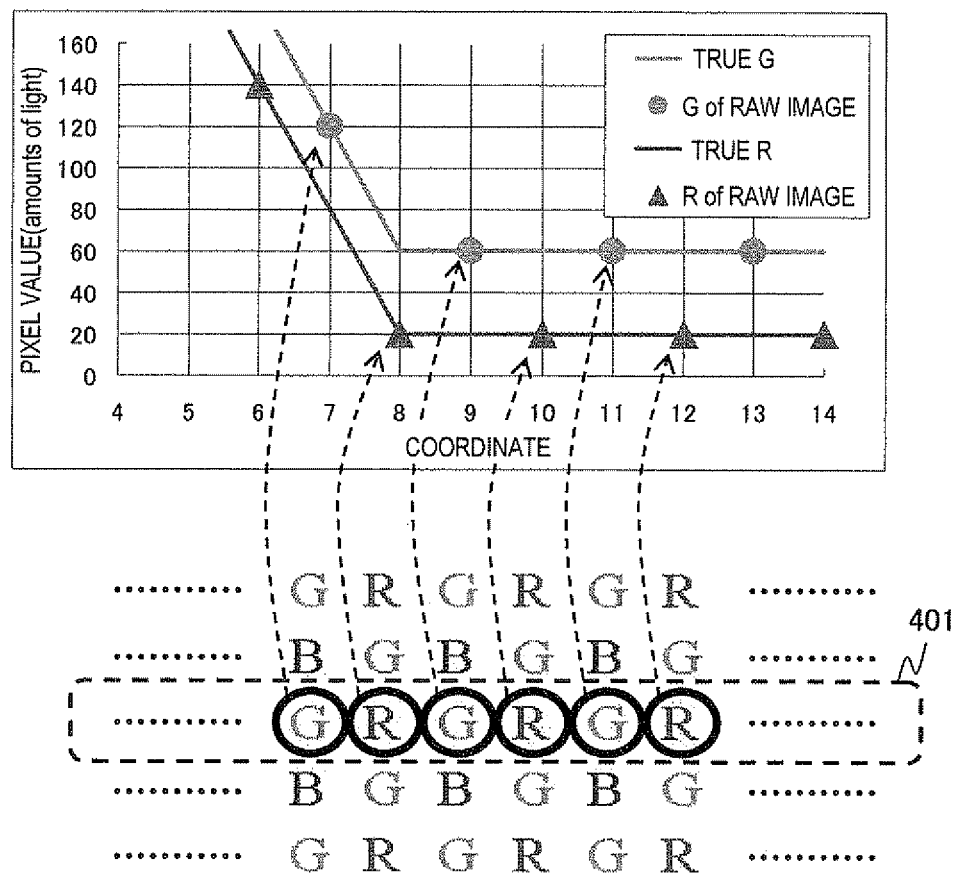
FIG. 7 is a diagram for explaining an effect of the electronic camera 101 according to the first embodiment.

In FIG. 7, G pixel values (● marks) of RAW image in a row 401 (row formed of R pixels and G pixels) in the horizontal direction that intersects a contour line rising in an upper left direction of a certain image, and a solid line passing through the ● marks indicate an image structure of true G element to be image-formed on the light-receiving surface of the imaging device 104 by the optical system 102. In like manner, R pixel values (▲ marks) in the row 401, and a solid line passing through the ▲ marks indicate an image structure of true R element to be image-formed on the light-receiving surface of the imaging device 104 by the optical system 102. Note that in FIG. 7, a state of a case where values of the G pixel value and the R pixel value (amounts of light) are different by a certain value in the row 401 is illustrated, for easier understanding. Further, since the Bayer format is employed, the R pixel and the G pixel are alternately arranged in the row 401, and regarding respective pixel values, the R value and the G value are alternately obtained.

Figure 8A:
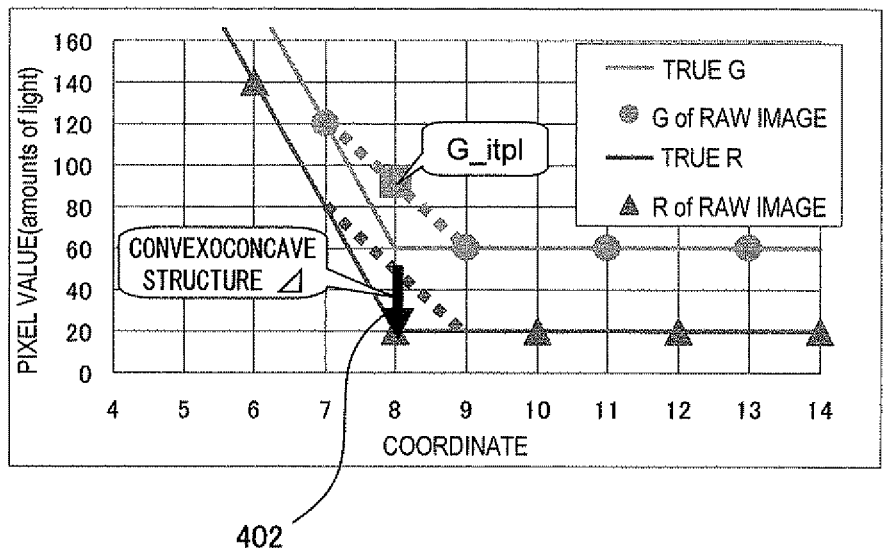
FIG. 8A and FIG. 8B are diagrams for explaining an effect of the electronic camera 101 according to the first embodiment.

FIG. 8A is a diagram illustrating a G interpolation value (■ mark) in the G interpolating part 305 at a coordinate 8 in FIG. 7. The ■ mark corresponds to a G interpolation value G_itpl interpolated and generated at the R pixel position in the neighborhood of the contour line which rises in the upper left direction. As can be understood from FIG. 8A, the ■ mark is deviated from the solid line indicating the true G element, so that the image is blurred at the G interpolation value G_itpl.

Here, when an angle of the contour line rising in the upper left direction made with the row 401 direction is less than 45 degrees, the direction determination part 302 determines, in the direction determination, that the image structure is of CH (horizontal) direction, and the interpolation processing in the CH direction is performed, resulting in that the result of interpolation as illustrated in FIG. 8A is obtained. Regarding the case of FIG. 8A, a downward arrow mark 402 illustrated at the coordinate 8 corresponds to a convexoconcave structure Δ, and it can be understood that the blur at the G interpolation value G_itpl is correctly estimated.

Figure 8B:
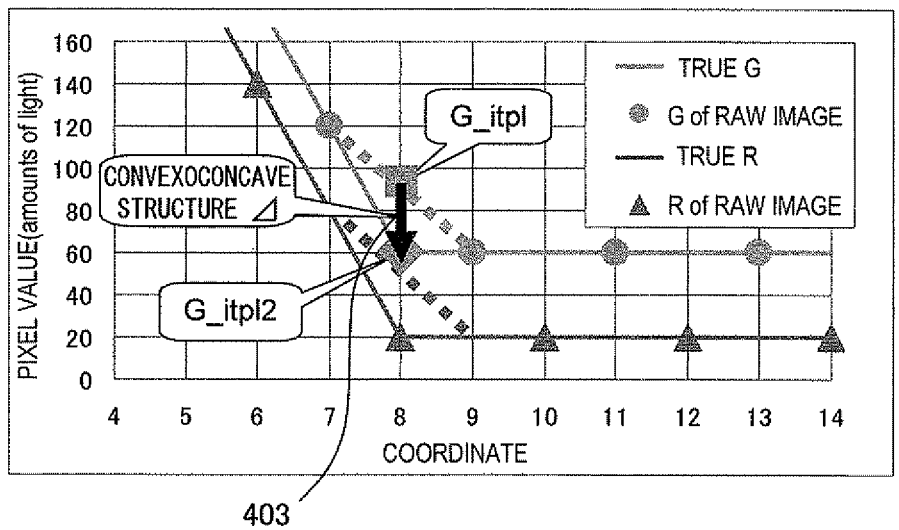

FIG. 8B is a diagram illustrating a second G interpolation value G_itpl2 (♦ mark) as a result of correcting the deviation of the G interpolation value G_itpl in FIG. 8A by the convexoconcave structure Δ. By adding the convexoconcave structure Δ indicated by the arrow mark 402 to the G interpolation value G_itpl, the second G interpolation value G_itpl2 indicated by the ♦ mark at which the blur is eliminated, is obtained.

Figure 9A:
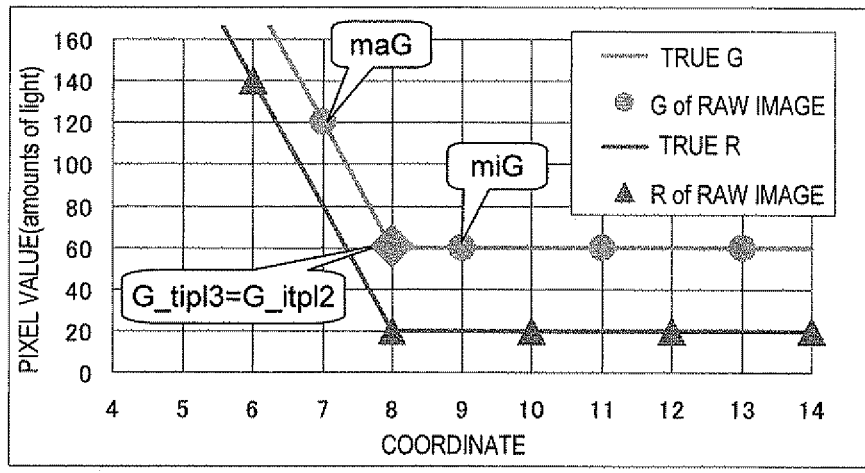
FIG. 9A and FIG. 9B are diagrams for explaining an effect of the electronic camera 101 according to the first embodiment.

FIG. 9A is a diagram illustrating a state of a case where the processing of the ringing clip part 307 is performed on the second G interpolation value G_itpl2 in FIG. 8B. The ringing clip part 307 performs the processing of clipping the second G interpolation value G_itpl2 to generate a third G interpolation value G_itpl3, and, in an example of image in FIG. 9A, the relation of miG≤G_itpl2≤maG is satisfied, so that the ringing clip part 307 directly sets the second G interpolation value G_itpl2 to the third G interpolation value G_itpl3. Accordingly, the third G interpolation value G_itpl3 output by the ringing clip part 307 corresponds to a favorable value at which the blur is eliminated, similar to the favorable second G interpolation value G_itpl2 at which the blur is eliminated.

As described above, it can be understood that in the example of image in which the ringing clip is invalid, it is possible to obtain the favorable image in which the blur is eliminated.

(Example of Image in which the Ringing Clip is Valid)

Figure 9B:
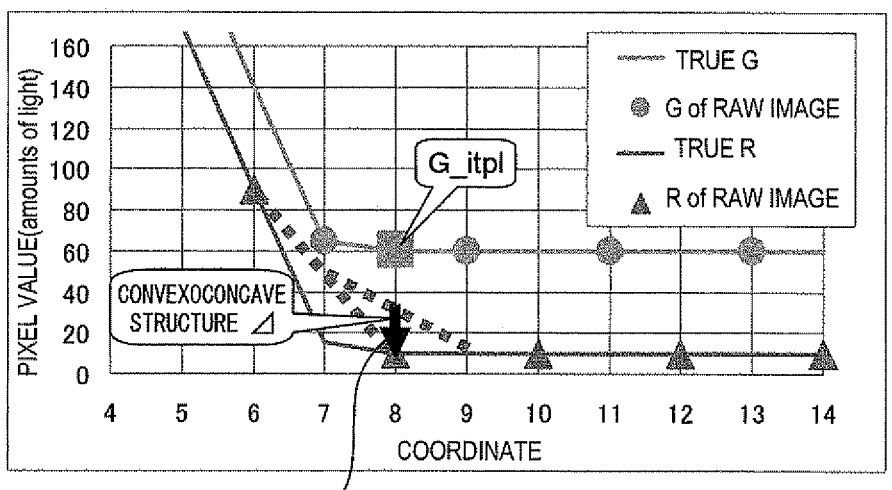
Figure 10A:
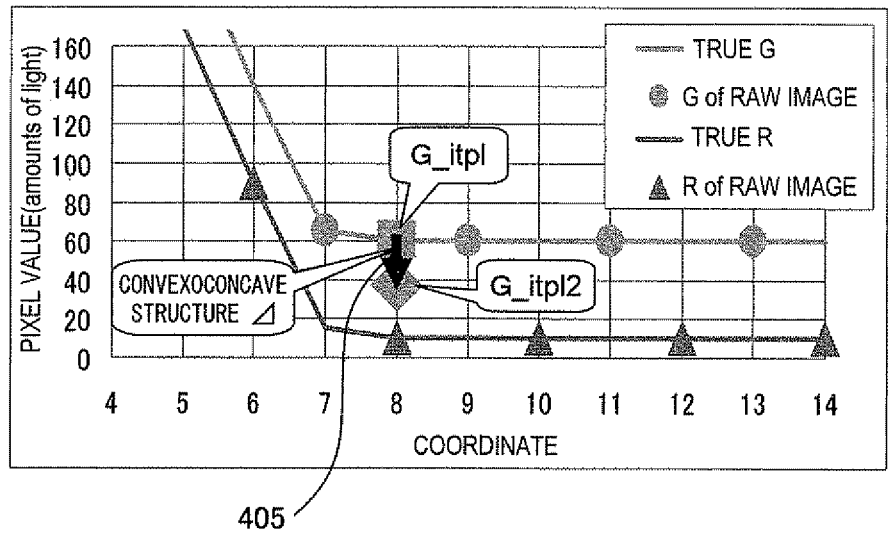
FIG. 10A and FIG. 10B are diagrams for explaining an effect of the electronic camera 101 according to the first embodiment.

Next, explanation will be made on a case where the ringing clip is valid. FIG. 9B is a diagram illustrating G pixel values (● marks) and R pixel values (▲ marks) of RAW image in a row 401 (row formed of R pixels and G pixels) in the horizontal direction that intersects a contour line rising in an upper left direction of an image, a solid line passing through the ● marks indicating true G element, and a solid line passing through the ▲ marks indicating true R element, similar to the previous example. What differs from the previous example is that the sampling position of the R pixel and the G pixel with respect to the contour line is horizontally shifted by one pixel, and the contour line rises in the upper left direction at a position of coordinate 7. Accordingly, there is almost no change at the position of coordinate 8 at which the target pixel of the interpolation processing exists. Regarding the case of FIG. 9B, the convexoconcave structure calculating part 303 erroneously estimates the blur at the G interpolation value G_itpl, due to the convexoconcave structure Δ, as indicated by an arrow mark 404. For this reason, as illustrated in FIG. 10A, as much as an arrow mark 405 is added to the ■ mark of the G interpolation value G_itpl, thereby correcting the value to the second G interpolation value G_itpl2 indicated by the ♦ mark. As described above, by adding the erroneously estimated convexoconcave structure Δ indicated by the arrow mark 405 to the G interpolation value G_itpl indicated by the ■ mark, a ringing occurs at the second G interpolation value G_itpl2 indicated by the ♦ mark. This is a problem in the conventional technique.

Figure 10B:
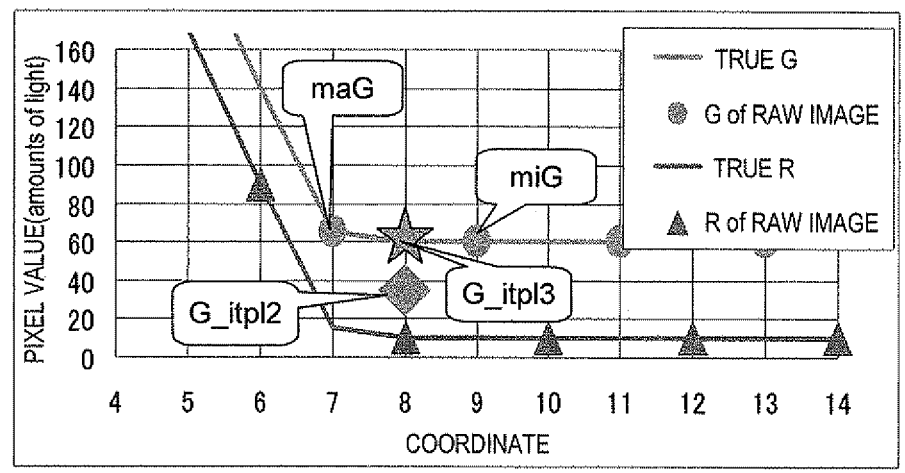

Accordingly, in the present embodiment, the ringing clip part 307 determines the third G interpolation value G_itpl3 as a result of clipping the second G interpolation value G_itpl2, as illustrated in FIG. 10B. In this case, since the relation of G_itpl2≤miG is satisfied, the ringing clip part 307 performs clipping to satisfy G_itpl3=miG, which results in generating G_itpl3 indicated by ★ mark at which the ringing is eliminated.

As has been described above, in the electronic camera 101 according to the first embodiment, it is possible to sharply resolve the image structure by adding the convexoconcave structure Δ, and to suppress an unnatural ringing when the correction is erroneously performed too much.

Second Embodiment

Figure 11:
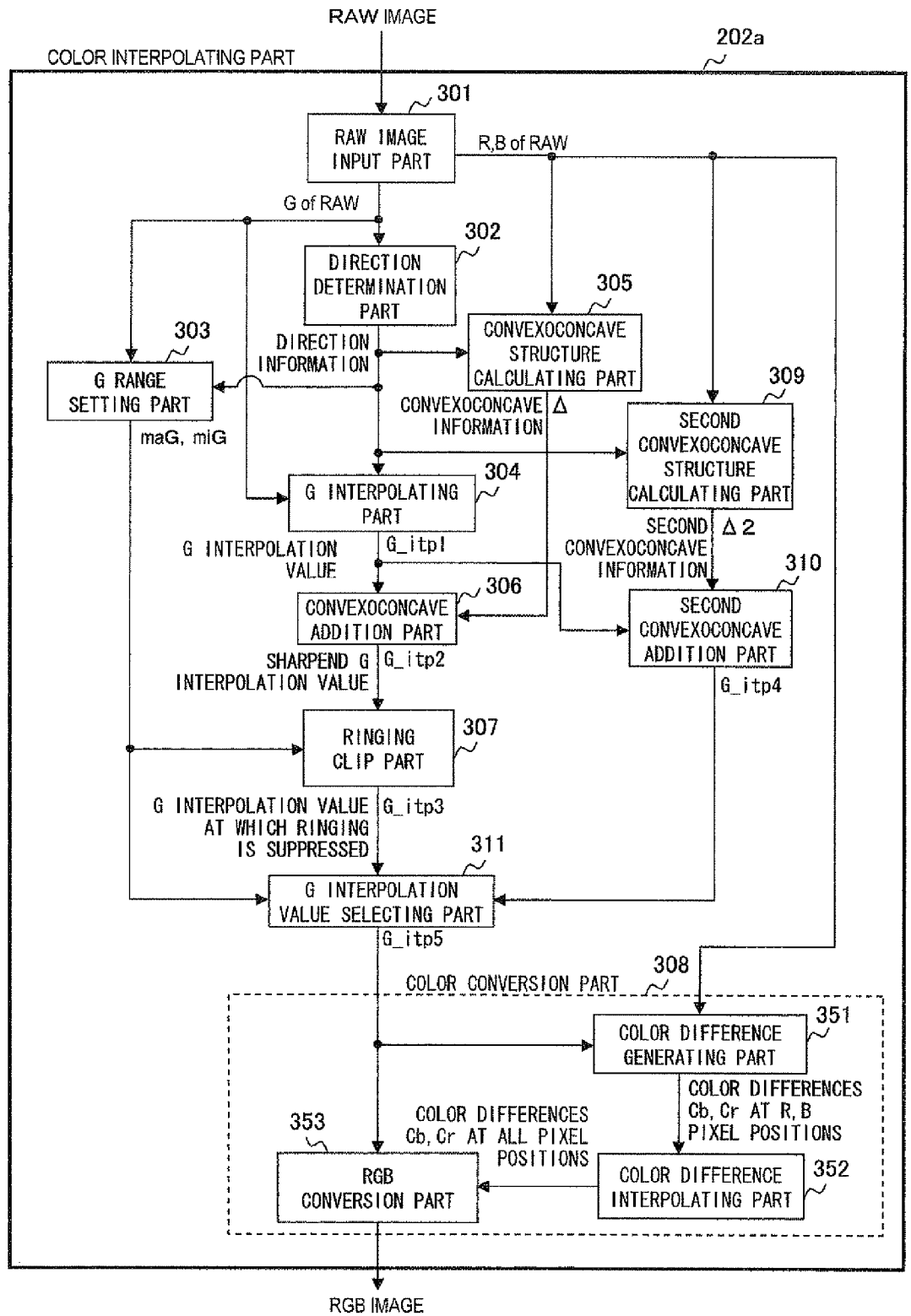
FIG. 11 is a block diagram illustrating a configuration and a flow of processing of a color interpolating part 202a of an electronic camera 101 according to a second embodiment.

FIG. 11 is a block diagram illustrating a configuration and a flow of processing of a color interpolating part 202a in an electronic camera 101 according to a second embodiment. Note that the configuration of the electronic camera 101 itself is the same as that of FIG. 1 explained in the first embodiment. Further, the color interpolating part 202a in the present embodiment generates RGB data with respect to each pixel by processing RAW data input from the WB part 201 in FIG. 2, similar to the color interpolating part 202 of the first embodiment.

In FIG. 11, the color interpolating part 202a is made up of, in addition to the block in which the same processing as that of the color interpolating part 202 in FIG. 3 is performed (the RAW image input part 301, the direction determination part 302, the G range setting part 303, the G interpolating part 304, the convexoconcave structure calculating part 305, the convexoconcave addition part 306, the ringing clip part 307 and the color conversion part 308), a second convexoconcave structure calculating part 309, a second convexoconcave addition part 310, and a G interpolation value selecting part 311.

Here, the RAW data input into the color interpolating part 202a is image data of Bayer format, as explained in FIG. 4A.

The second convexoconcave structure calculating part 309 calculates a second convexoconcave structure Δ2 (i, j). Note that Δ2 (i, j) is a second convexoconcave element value at the R pixel position (or the B pixel position) (i, j) of the RAW image, similar to Δ(i, j) in FIG. 6D. Further, Z2 (i, j) and Z (i, j) are similar to those of the first embodiment. First, the second convexoconcave structure calculating part 309 calculates, for each R pixel position (or each B pixel position) of the RAW image, a maximum value (maZ2) and a minimum value (miZ2) in a range of Z2 in the neighborhood of the pixel position, using (equation 14) and (equation 15). Concretely, when the image structure determined by the (equation 5) and the (equation 6) is of vertical, a maximum value or a minimum value of Z2 of R pixels (or B pixels) above and below the target pixel (i, j) is set as the maximum value (maZ2) or the minimum value (miZ2) of the target pixel (i, j), and when the image structure is of horizontal, a maximum value or a minimum value of Z2 of R pixels (or B pixels) on the left and right of the target pixel (i, j) is set as the maximum value (maZ2) or the minimum value (miZ2) of the target pixel (i, j). Further, when the image structure is of neither vertical nor horizontal, a maximum value or a minimum value of Z2 of R pixels (or B pixels) above and below and on the left and right of the target pixel (i, j) is set as the maximum value (maZ2) or the minimum value (miZ2) of the target pixel (i, j).

$$maZ2 = \begin{cases} \text{if } (HV(i,j) = -1) & \text{(When image structure is of veritcal)} \\ \max(Z2(i,j), Z2(i,j+2)) & \\ \text{if } (HV(i,j) = 1) & \text{(When image structure is of horizontal)} \\ \max(Z2(i-2,j), Z2(i+2,j)) & \\ \text{if } (HV(i,j) = 0) & \text{(When it cannot be said that image structure is of vertical or horizontal)} \\ \max(Z2(i-2,j), Z2(i+2,j), Z2(i,j-2), Z2(i,j+2)) & \end{cases}$$ (Equation 14)

$$miZ2 = \begin{cases} \text{if } (HV(i,j) = -1) & \text{(When image structure is of vertical)} \\ \min(Z2(i,j-2), Z2(i,j+2)) & \\ \text{if } (HV(i,j) = 1) & \text{(When image structure is of horizontal)} \\ \min(Z2(i-2,j), Z2(i+2,j)) & \\ \text{if } (HV(i,j) = 0) & \text{(When it cannot be said that image structure is of vertical or horizontal)} \\ \min(Z2(i-2,j), Z2(i+2,j), Z2(i,j-2), Z2(i,j+2)) & \end{cases}$$ (Equation 15)

Here, max ( ) represents a maximum value in ( ), and min ( ) represents a minimum value in ( ).

Next, by using (equation 16), $\Delta 2$ (i, j) being an amount of deviation of Z2 from the aforementioned range at the target pixel (i, j) (deviation amount: second convexoconcave element value) is determined. Concretely, Z2 at the target pixel (i, j) and the maximum value (maZ2) or the minimum value (miZ2) of Z2 (i, j) at the target pixel (i, j) determined by the (equation 14) or the (equation 15) are compared, in which when Z2 (i, j) at the target pixel (i, j) is smaller than the minimum value (miZ2), ½ of a difference between Z2 (i, j) and the minimum value (miZ2) is set to $\Delta 2$ (i, j). In like manner, when Z2 (i, j) at the target pixel (i, j) is larger than the maximum value (maZ2), ½ of a difference between Z2 (i, j) and the maximum value (maZ2) is set to $\Delta 2$ (i, j). When Z2 (i, j) at the target pixel (i, j) is between the minimum value (miZ2) and the maximum value (maZ2), it is set that there is no deviation amount, and $\Delta 2$ (i, j) is set to 0.

$$\Delta 2(i,j) = \begin{cases} (Z2(i,j) - miZ2)/2 & \text{if } (Z2(i,j) < miZ2) \\ (Z2(i,j) - maZ2)/2 & \text{if } (Z2(i,j) > maZ2) \\ 0 & \text{if } (miZ2 \le Z2(i,j) \le maZ2) \end{cases}$$ (Equation 16)

The second convexoconcave addition part 310 calculates, with respect to each R pixel position (or each B pixel position) of the RAW image, a fourth G interpolation value G_itpl4 (i, j) by adding the second convexoconcave element value $\Delta 2$ to the G interpolation value G_itpl, through (equation 17), for example.

$$G\_itpl4(i,j) = G\_itpl(i,j) + k2 \times \Delta 2(i,j)$$ (Equation 17)

Here, a coefficient k2 is a weighting parameter for controlling the degree of adding the second convexoconcave element value $\Delta 2$, and is set to about 1, for example.

The G interpolation value selecting part 311 selects either the third G interpolation value G_itpl3 or the fourth G interpolation value G_itpl4 and sets the value to a fifth G interpolation value G_itpl5, using (equation 18), at each R pixel position (or each B pixel position) of the RAW image. Concretely, the maximum value maG of G value and the minimum value miG of G value previously determined through the (equation 7) and the (equation 8), and the fourth G interpolation value G_itpl4 are compared, in which when the fourth G interpolation value G_itpl4 is between maG and miG, the third G interpolation value G_itpl3 is selected to be set to the fifth G interpolation value G_itpl5, and in the other cases, the fourth G interpolation value G_itpl4 is selected to be set to the fifth G interpolation value G_itpl5.

$$G\_itpl5(i,j) = \begin{cases} \text{if } (miG \le G\_itpl4(i,j) \le maG) \\ G\_itpl3(i,j) \\ \text{if } (G\_itpl4(i,j) < miG \text{ or } \\ maG < G\_itpl4(i,j)) \\ G\_itpl4(i,j) \end{cases}$$ (Equation 18)

The subsequent processing of the color conversion part 308 is the same as that of FIG. 3 in the first embodiment, so that overlapped explanation will be omitted. Note that the color conversion part 308 uses the fifth G interpolation value G_itpl5, instead of the third G interpolation value G_itpl3. Further, the color conversion part 308 generates RGB data with respect to all pixels, as illustrated in FIG. 4E.

As has been described above, the color interpolating part 202a outputs the RAW data input by the RAW image input part 301 by converting the data into the RGB data. Particularly, in the present embodiment, by interpolating the G value at the R pixel position (or the B pixel position) of the RAW image in accordance with the image structure, the image structure can be sharply resolved, and by clipping the ringing element in the ringing clip part 307, an unnatural ringing can be suppressed. Further, the G interpolation value selecting part 311 selects, in accordance with the G range set by the G range setting part 304, the fourth G interpolation value G_itpl4 determined by the second convexoconcave structure calculating part 309 and the second convexoconcave addition part 310, so that the interpolation value erroneously corrected by the ringing clip part 307 can be returned to a correct value.

Note that as has been described in FIG. 2, the RGB data generated in the color interpolating part 202a is subjected to the image processing such as the gamma correction, the chroma enhancement, the edge enhancement or the noise reduction in the image processing part 107, and is then displayed on the displaying part 110 by the camera controlling part 108, and JPEG data after being subjected to the image compression processing such as jPEG is saved in the memory card 112*a*.

Here, description will be made on a relation between the respective parts of the present embodiment and the claims. Note that as has been described in the first embodiment, the G element, the R element and the B element in the Bayer format correspond to the first color element, the second color element and the third color element, respectively, and the first type pixel, the second type pixel and the third type pixel correspond to the G pixel, the R pixel and the B pixel, respectively. Further, the target pixel in which the first color element is unknown corresponds to the R pixel or the B pixel. Further, the second convexoconcave structure calculating part 309 in the block added in the second embodiment corresponds to a second convexoconcave structure calculating part, which calculates a second convexoconcave structure by referring to the target pixel and at least either the R pixels or the B pixels in the neighborhood of the target pixel. The second convexoconcave addition part 310 corresponds to a second convexoconcave addition part, which generates a fourth interpolation value of G element (G_itpl4) by adding the second convexoconcave structure $\Delta 2$ to the G element interpolation value G_itpl. The G interpolation value selecting part 311 corresponds to an interpolation value selecting part, which selects either the third interpolation value of G element (G_itpl3) or the fourth interpolation value of G element (G_itpl4).

Note that in the present embodiment, the color conversion part 308 is designed to generate and output the RGB data, but, it may be designed to output luminance and color difference image data or to generate RGB data without generating color differences, similar to the first embodiment. Alternatively, it is also possible to design such that the image data is converted into another image data format to be output.

As described above, in the electronic camera 101 according to the present embodiment, by performing the appropriate interpolation in accordance with the image structure when determining the G value at the R pixel position (or the B pixel position) of the captured RAW image, it is possible to sharply resolve the image structure, and to suppress an unnatural ringing. Particularly, in the present embodiment, by returning the interpolation value erroneously corrected by the ringing clip part 307 to the correct value, it is possible to reproduce even an image structure having a high high-frequency component, with good accuracy.

Further, in the above-described embodiment, the convexoconcave structure calculating part 303 uses Z2 (added value of the R value at the R pixel position and the B value at the B pixel position) when determining the convexoconcave element $\Delta(i, j)$, but, it may also use Z (value of either the R value at the R pixel position or the B value at the B pixel position), instead of Z2. Generally, when there is chromatic aberration, the use of Z2 stabilizes an image quality, but, the use of Z makes the processing easier, and thus is suitable for a case where a camera in which a processing capability of CPU is low is employed, a case where high-speed processing such as continuous photographing is required, and the like.

Further, it is also possible to set the determination condition in the G interpolation value selecting part 311 as in the following modified example 1 and modified example 2.

Modified Example 1

As the modified example 1 of the determination condition in the G interpolation value selecting part 311, the value of either the third G interpolation value G_itpl3 or the fourth G interpolation value G_itpl4, which is changed greater than the other with respect to the G interpolation value G_itpl is selected through (equation 19).

$$G\_itpl5(i, j) = \begin{cases} \text{if } (|G\_itpl4(i, j) - G\_itpl(i, j)| \leq \\ \quad |G\_itpl3(i, j) - G\_itpl(i, j)|) \\ G\_itpl3(i, j) \\ \text{if } (|G\_itpl4(i, j) - G\_itpl(i, j)| > \\ \quad |G\_itpl3(i, j) - G\_itpl(i, j)|) \\ G\_itpl4(i, j) \end{cases} \quad \text{(Equation 19)}$$

Modified Example 2

As the modified example 2 of the determination condition in the G interpolation value selecting part 311, a smaller value of a difference value between the third G interpolation value G_itpl3 and the second G interpolation value G_itpl2 and a difference value between the fourth G interpolation value G_itpl4 and the second G interpolation value G_itpl2, is selected, as indicated in (equation 20).

$$G\_itpl5(i, j) = \begin{cases} \text{if } (|G\_itpl4(i, j) - G\_itpl2(i, j)| \geq \\ \quad |G\_itpl3(i, j) - G\_itpl2(i, j)|) \\ G\_itpl3(i, j) \\ \text{if } (|G\_itpl4(i, j) - G\_itpl2(i, j)| < \\ \quad |G\_itpl3(i, j) - G\_itpl2(i, j)|) \\ G\_itpl4(i, j) \end{cases} \quad \text{(Equation 20)}$$

[Effect]

Figure 12A:
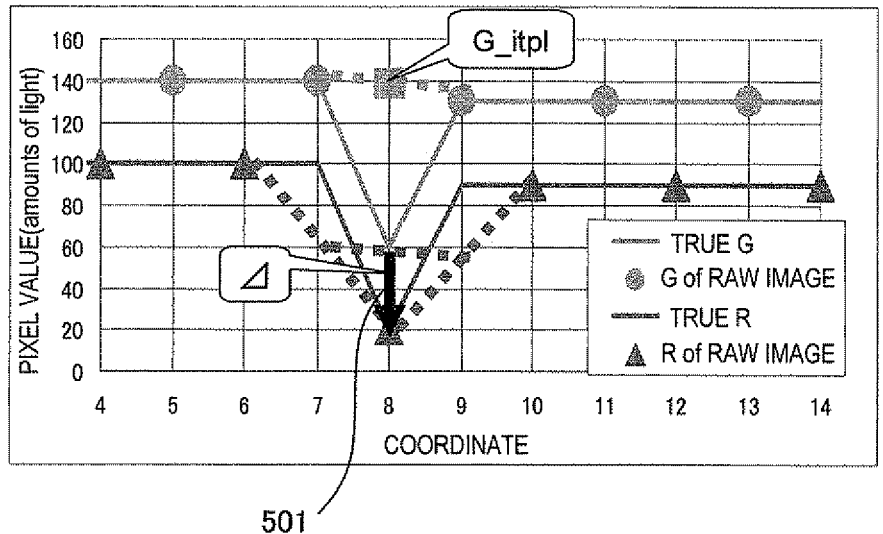
FIG. 12A and FIG. 12B are diagrams for explaining an effect of the electronic camera 101 according to the second embodiment.

Next, description will be made on an effect of the electronic camera 101 according to the second embodiment. FIG. 12A illustrates an example of fine image structure of high frequency (vertical stripe or the like, for example). Note that in FIG. 12A, G pixel values (● marks) of a RAW image in a row 401 (row formed of R pixels and G pixels) in the horizontal direction and a solid line passing through the ● marks indicate an image structure of true G element to be image-formed on the light-receiving surface of the imaging device 104 by the optical system 102, similar to FIG. 7. In like manner, R pixel values (▲ marks) in the row 401 and a solid line passing through the ▲ marks indicate an image structure of true R element to be image-formed on the light-receiving surface of the imaging device 104 by the optical system 102. Note that in FIG. 12A, a state of a case where values of the G pixel value and the R pixel value (amounts of light) are different by a certain value in the row 401 is illustrated, similar to FIG. 7. Further, since the Bayer format is employed, the R pixel and the G pixel are alternately arranged in the row 401, and regarding respective pixel values, the R value and the G value are alternately obtained.

FIG. 12A is a diagram illustrating a G interpolation value (■ mark) in the G interpolating part 305 at the coordinate 8 in FIG. 7. The ■ mark corresponds to a G interpolation value G_itpl interpolated and generated at the R pixel position in the neighborhood of the vertical stripe with high high-frequency component. As can be understood from FIG. 12A, the ■ mark is deviated from the solid line indicating the true G element, so that the image is blurred at the G interpolation value G_itpl.

Figure 12B:
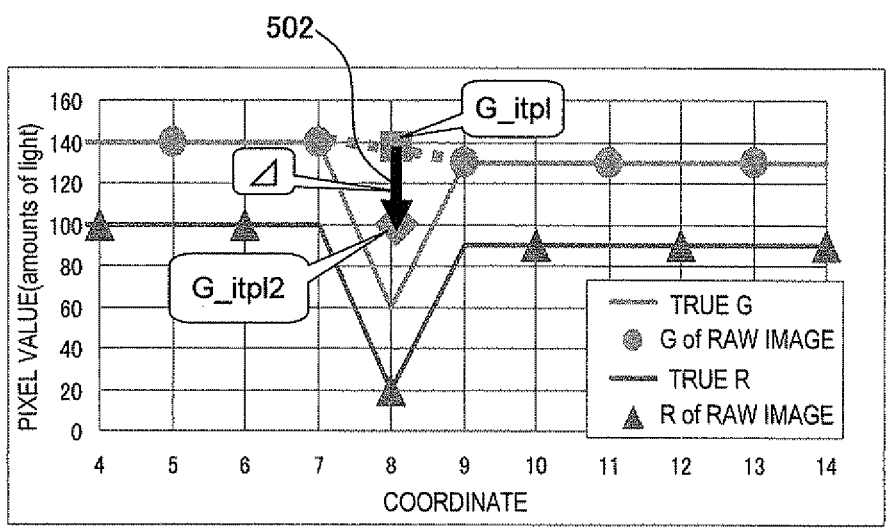

Here, an arrow mark 501 in FIG. 12A indicates a convexoconcave element A, and reproduces a direction of slightly correcting the blur at the G interpolation value G_itpl. Therefore, as illustrated in FIG. 12B, by adding the convexoconcave element A to the G interpolation value G_itpl, it is possible to generate a second G interpolation value G_itpl2 indicated by ♦ mark that reproduces the fine structure to a certain degree.

Figure 13A:
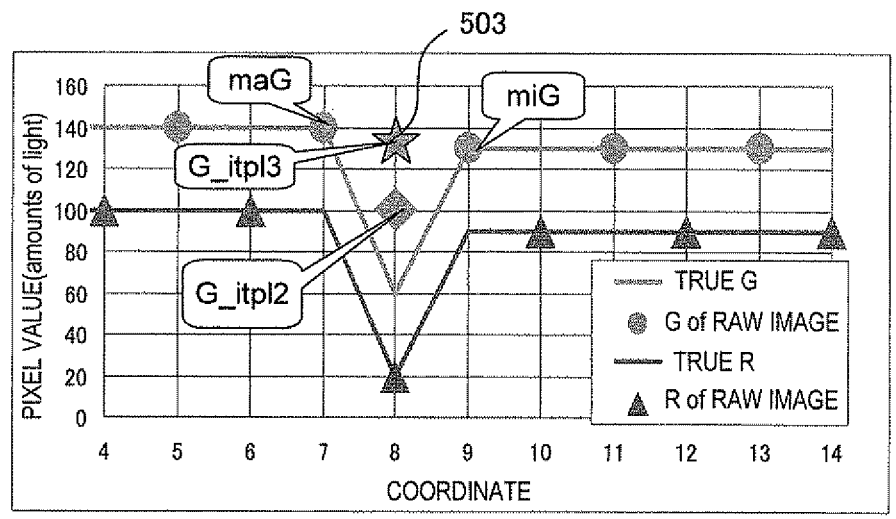
FIG. 13A and FIG. 13B are diagrams for explaining an effect of the electronic camera 101 according to the second embodiment.

However, in FIG. 13A, the second G interpolation value G_itpl2 indicated by the ♦ mark is clipped to be corrected to a third G interpolation value G_itpl3 (=miG) indicated by ★ mark through the processing of the ringing clip part 307, resulting in that the fine structure such as vertical stripe cannot be reproduced.

Figure 13B:
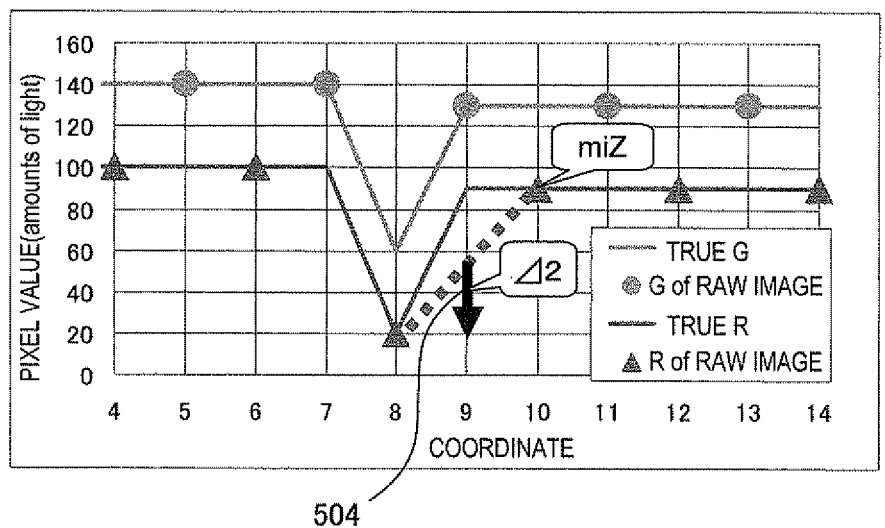

Accordingly, as illustrated in FIG. 13B, the second convexoconcave structure calculating part 309 calculates a second convexoconcave element Δ2 indicated by an arrow mark 504. The second convexoconcave element Δ2 represents an amount of Z2 at the target pixel position that is deviated from the range of the value of Z2 in the neighborhood of the target pixel, and can reproduce a fine image structure of vertical stripe as illustrated in FIG. 13B.

Figure 14A:
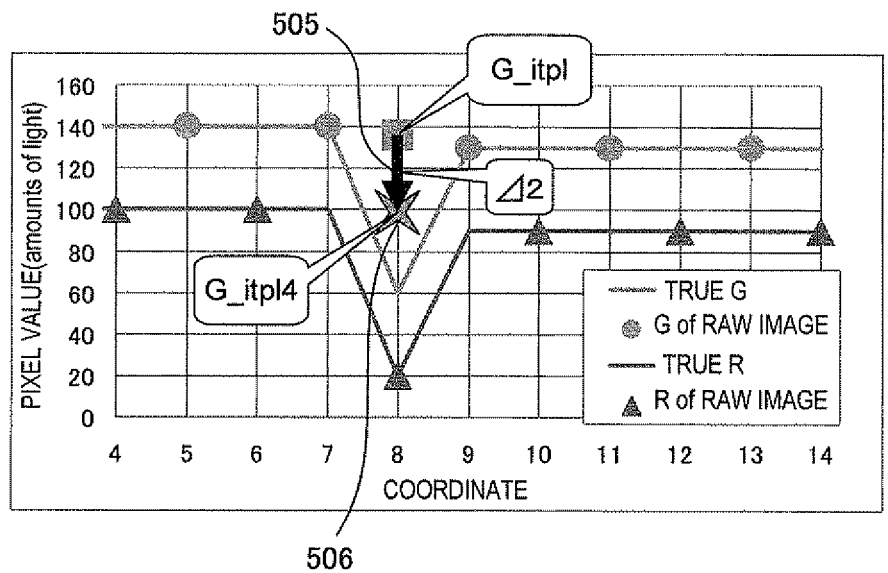
FIG. 14A and FIG. 14B are diagrams for explaining an effect of the electronic camera 101 according to the second embodiment.

Subsequently, the second convexoconcave addition part 310 generates a fourth G interpolation value G_itpl4 indicated by x mark as a result of adding the second convexoconcave element Δ2 to the G interpolation value G_itpl, as illustrated in FIG. 14A.

Figure 14B:
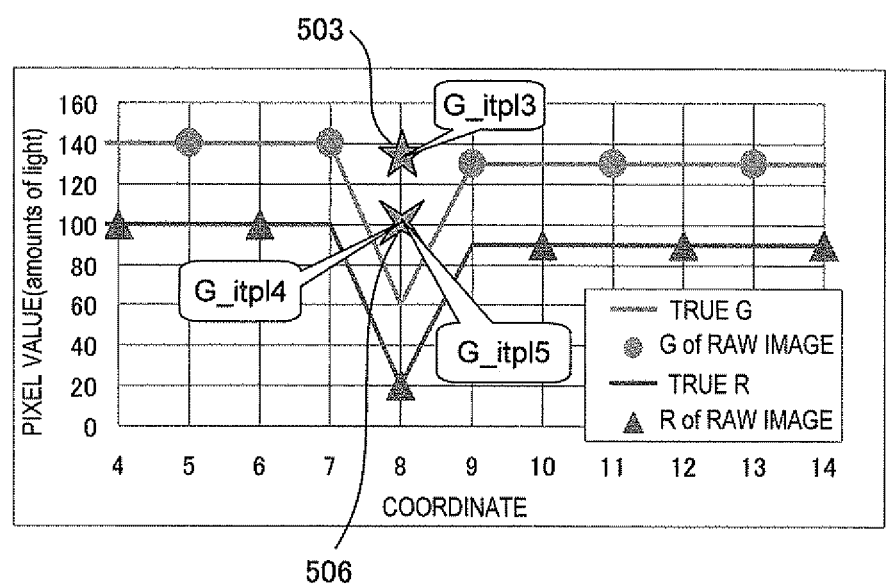

Further, as illustrated in FIG. 14B, the G interpolation value selecting part 311 selects the value of either the third G interpolation value G_itpl3 or the fourth G interpolation value G_itpl4, whose amount of deviation with respect to the range of the G pixels in the neighborhood of the target pixel is greater than the other. In the example of the same drawing, the fourth G interpolation value G_itpl4 is selected as a fifth G interpolation value G_itpl5. As above, it is possible to reproduce an image structure having a high high-frequency component such as a vertical stripe, with good accuracy.

Note that when the processing of the present embodiment is applied to a normal contour line in which the high-frequency component as described in FIG. 14A, FIG. 14B is not high, Z2 takes a value close to 0, so that the second convexoconcave element Δ2 becomes 0, resulting in that the result of processing of the present embodiment becomes the same result as that of the first embodiment.

The image processing device, the storage medium storing the image processing program and the electronic camera according to the present invention have been described above by citing the examples in the respective embodiments, and it is also possible to realize the processing of the image processing part 107 using a stand-alone image processing device or an image processing program for a personal computer. In this case, for example, the respective processings in the image processing part 107 are executed by attaching a storage medium such as a memory card in which already photographed RAW data is stored to the personal computer, instead of using the image buffer 106, and processed image data is stored in the memory card again. Alternatively, it is also possible to design such that only the processing of the color interpolating part 202 is executed, and the RAW data is converted into the RGB data or the like.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing device, comprising:
an image input part inputting image data formed of, among a plurality of pixels each corresponding to any one of two-dimensionally arranged a first color element, a second color element, and a third color element, a first type pixel whose first color element is known and whose second color element and third color element are unknown, a second type pixel whose second color element is known and whose first color element and third color element are unknown, and a third type pixel whose third color element is known and whose first color element and second color element are unknown;
a first color element interpolating part determining, with respect to a target pixel in which the first color element is unknown, a first interpolation value of the first color element by referring to the first type pixels in a neighborhood of the target pixel;
a first convexoconcave structure calculating part calculating a first convexoconcave structure in the target pixel by referring to the target pixel and at least either of the second type pixels and the third type pixels in the neighborhood of the target pixel;
a first convexoconcave addition part adding the first convexoconcave structure to the first interpolation value to determine a second interpolation value;
a first color range calculating part determining a range of the first color element in the target pixel by referring to the first type pixels in the neighborhood of the target pixel;
a clip part determining a third interpolation value by clipping the second interpolation value to fall within the range;
a second convexoconcave structure calculating part calculating a second convexoconcave structure in the target pixel by referring to the target pixel and at least either of the second type pixels and the third type pixels in the neighborhood of the target pixel;
a second convexoconcave addition part adding the second convexoconcave structure to the first interpolation value to determine a fourth interpolation value; and
an interpolation value selecting part selecting one of the third interpolation value and the fourth interpolation value, based on the range set by the first color range calculating part.

2. The image processing device according to claim 1, wherein
the first convexoconcave structure calculating part calculates the first convexoconcave structure in the target pixel by determining a difference between an average value of the referred pixels in the neighborhood of the target pixel and a value of the target pixel.

3. The image processing device according to claim 2, further comprising:
a second convexoconcave structure calculating part calculating a second convexoconcave structure in the target pixel by referring to the target pixel and at least either of the second type pixels and the third type pixels in the neighborhood of the target pixel;
a second convexoconcave addition part adding the second convexoconcave structure to the first interpolation value to determine a fourth interpolation value; and an interpolation value selecting part selecting one of the third interpolation value and the fourth interpolation value, based on the range set by the first color range calculating part.

4. The image processing device according to claim 1, wherein
the second convexoconcave structure calculating part calculates the second convexoconcave structure by determining a range of the color element referred to by the first convexoconcave structure calculating part in the neighborhood of the target pixel, and determining a deviation amount of a value of the target pixel with respect to the range of the color element.

5. The image processing device according to claim 3, wherein
the second convexoconcave structure calculating part calculates the second convexoconcave structure by determining a range of the color element referred to by the first convexoconcave structure calculating part in the neighborhood of the target pixel, and determining a deviation amount of the value of the target pixel with respect to the range of the color element.

6. The image processing device according to claim 1, wherein
the interpolation value selecting part selects the third interpolation value when the fourth interpolation value is within the range of the first color element determined by the first color range calculating part, and selects the fourth interpolation value when the fourth interpolation value is out of the range.

7. The image processing device according to claim 3, wherein
the interpolation value selecting part selects the third interpolation value when the fourth interpolation value is within the range of the first color element determined by the first color range calculating part, and selects the fourth interpolation value when the fourth interpolation value is out of the range.

8. The image processing device according to claim 1, wherein
the interpolation value selecting part selects one of the third interpolation value and the fourth interpolation value, whose difference with the first interpolation value is greater.

9. The image processing device according to claim 3, wherein
the interpolation value selecting part selects one of the third interpolation value and the fourth interpolation value, whose difference with the first interpolation value is greater than the other.

10. The image processing device according to claim 1, wherein
the interpolation value selecting part selects one of the third interpolation value and the fourth interpolation value, whose difference with the second interpolation value is greater than the other.

11. The image processing device according to claim 3, wherein
the interpolation value selecting part selects one of the third interpolation value and the fourth interpolation value, whose difference with the second interpolation value is greater than the other.

12. The image processing device according to claim 1, wherein
the arrangement corresponds to a Bayer format, the first color element, the second color element and the third color element correspond to a G element, an R element and a B element, respectively, and the first type pixel, the second type pixel and the third type pixel correspond to a G pixel, an R pixel and a B pixel, respectively.

13. The image processing device according to claim 2, wherein
the arrangement corresponds to a Bayer format, the first color element, the second color element and the third color element correspond to a G element, an R element and a B element, respectively, and the first type pixel, the second type pixel and the third type pixel correspond to a G pixel, an R pixel and a B pixel, respectively.

14. A non-transitory computer readable storage medium storing an image processing program causing a computer to execute color interpolation processing of inputting image data formed of, among a plurality of pixels each corresponding to any one of two-dimensionally arranged a first color element, a second color element and a third color element, a first type pixel whose first color element is known and whose second color element and third color element are unknown, a second type pixel whose second color element is known and whose first color element and third color element are unknown, and a third type pixel whose third color element is known and whose first color element and second color element are unknown, and generating image data in which each pixel includes the first color element, the second color element and the third color element, the non-transitory computer readable storage medium storing the image processing program, comprising:
a first color element interpolating step determining, with respect to a target pixel in which the first color element is unknown in the input image data, a first interpolation value of the first color element by referring to the first type pixels in a neighborhood of the target pixel;
a first convexoconcave structure calculating step calculating a first convexoconcave structure in the target pixel by referring to the target pixel and at least either of the second type pixels and the third type pixels in a neighborhood of the target pixel;
a first convexoconcave addition step adding the first convexoconcave structure to the first interpolation value to determine a second interpolation value;
a first color range calculating step determining a range of the first color element in the target pixel by referring to the first type pixels in the neighborhood of the target pixel;
a clip step determining a third interpolation value by clipping the second interpolation value to fall within the range;
a second convexoconcave structure calculating step calculating a second convexoconcave structure in the target pixel by referring to the target pixel and at least either of the second type pixels and the third type pixels in the neighborhood of the target pixel;
a second convexoconcave addition step adding the second convexoconcave structure to the first interpolation value to determine a fourth interpolation value; and
an interpolation value selecting step selecting one of the third interpolation value and the fourth interpolation value, based on the range set by the first color range calculating step.

15. An electronic camera mounting the image processing device according to claim 1, comprising:
an imaging part making a subject light incident thereon through an optical system, photographing an image formed of a plurality of pixels in which each pixel has one color element of any one of a plurality of color elements, and outputting the image to the image processing device; and a recording part recording the image output by the image processing device, in a recording medium.

16. An electronic camera mounting the image processing device according to claim 2, comprising:

an imaging part making a subject light incident thereon through an optical system, photographing an image formed of a plurality of pixels in which each pixel has one color element of any one of a plurality of color elements, and outputting the image to the image processing device; and a recording part recording the image output by the image processing device, in a recording medium.

17. An electronic camera mounting the image processing device according to claim 3, comprising:

an imaging part making a subject light incident thereon through an optical system, photographing an image formed of a plurality of pixels in which each pixel has one color element of any one of a plurality of color elements, and outputting the image to the image processing device; and a recording part recording the image output by the image processing device, in a recording medium.

18. An image processing device, comprising:

an image input part inputting image data formed of, among a plurality of pixels each corresponding to any one of two-dimensionally arranged a first color element, a second color element, and a third color element, a first type pixel whose first color element is known and whose second color element and third color element are unknown, a second type pixel whose second color element is known and whose first color element and third color element are unknown, and a third type pixel whose third color element is known and whose first color element and second color element are unknown;

a first color element interpolating part determining, with respect to a target pixel in which the first color element is unknown, a first interpolation value of the first color element by referring to the first type pixels in a neighborhood of the target pixel;

a first convexoconcave structure calculating part calculating a first convexoconcave structure in the target pixel by referring to the target pixel and at least either of the second type pixels and the third type pixels in the neighborhood of the target pixel;

a first convexoconcave addition part adding the first convexoconcave structure to the first interpolation value to determine a second interpolation value;

a first color range calculating part determining a maximum value and a minimum value of the first color element in the target pixel by referring to the first type pixels in the neighborhood of the target pixel;

a clip part setting the minimum value of the first color element as a third interpolation value when the second interpolation value is below or equal to the minimum value of the first color element, setting the maximum value of the first color element as the third interpolation value when the second interpolation value is above or equal to the maximum value of the first color element, and setting the second interpolation value as the third interpolation value when the second interpolation value is between the maximum value and the minimum value of the first color element by comparing the maximum value and the minimum value of the first color element calculated by the first color range calculating part with the second interpolation value.

19. A non-transitory computer readable storage medium storing an image processing program causing a computer to execute color interpolation processing of inputting image data formed of, among a plurality of pixels each corresponding to any one of two-dimensionally arranged a first color element, a second color element and a third color element, a first type pixel whose first color element is known and whose second color element and third color element are unknown, a second type pixel whose second color element is known and whose first color element and third color element are unknown, and a third type pixel whose third color element is known and whose first color element and second color element are unknown, and generating image data in which each pixel includes the first color element, the second color element and the third color element, the non-transitory computer readable storage medium storing the image processing program, comprising:

a first color element interpolating step determining, with respect to a target pixel in which the first color element is unknown in the input image data, a first interpolation value of the first color element by referring to the first type pixels in a neighborhood of the target pixel;

a first convexoconcave structure calculating step calculating a first convexoconcave structure in the target pixel by referring to the target pixel and at least either of the second type pixels and the third type pixels in the neighborhood of the target pixel;

a first convexoconcave addition step adding the first convexoconcave structure to the first interpolation value to determine a second interpolation value;

a first color range calculating part determining a maximum value and a minimum value of the first color element in the target pixel by referring to the first type pixels in the neighborhood of the target pixel;

a clip step setting the minimum value of the first color element as a third interpolation value when the second interpolation value is below or equal to the minimum value of the first color element, setting the maximum value of the first color element as the third interpolation value when the second interpolation value is above or equal to the maximum value of the first color element, and setting the second interpolation value as the third interpolation value when the second interpolation value is between the maximum value and the minimum value of the first color element by comparing the maximum value and the minimum value of the first color element calculated at the first color range calculating step with the second interpolation value.

* * * * *